US010269331B2

United States Patent
Sato et al.

(10) Patent No.: US 10,269,331 B2
(45) Date of Patent: Apr. 23, 2019

(54) DISPLAY CONTROL DEVICE FOR VEHICLE

(71) Applicant: FUJI JUKOGYO KABUSHIKI KAISHA, Tokyo (JP)

(72) Inventors: Noeru Sato, Tokyo (JP); Takeshi Torii, Tokyo (JP); Ryuichi Sumikawa, Tokyo (JP)

(73) Assignee: Subaru Corporation, Tokyo (JP)

( * ) Notice: Subject to any disclaimer, the term of this patent is extended or adjusted under 35 U.S.C. 154(b) by 18 days.

(21) Appl. No.: 15/439,022

(22) Filed: Feb. 22, 2017

(65) Prior Publication Data
US 2017/0270899 A1    Sep. 21, 2017

(30) Foreign Application Priority Data

Mar. 18, 2016    (JP) .................... 2016-055829

(51) Int. Cl.
| | |
|---|---|
| *G09G 5/00* | (2006.01) |
| *G09G 5/38* | (2006.01) |
| *G06F 3/01* | (2006.01) |
| *G06T 11/60* | (2006.01) |

(52) U.S. Cl.
CPC .............. *G09G 5/38* (2013.01); *G06F 3/013* (2013.01); *G06T 11/60* (2013.01)

(58) Field of Classification Search
CPC ....... G06T 19/00; G06T 19/006; G06T 17/00; H04N 5/272; A63F 13/10
USPC .......................................................... 345/632
See application file for complete search history.

(56) References Cited

U.S. PATENT DOCUMENTS

| | | | | |
|---|---|---|---|---|
| 8,344,894 B2* | 1/2013 | Szczerba | ............... | B60K 28/066 340/435 |
| 2005/0154505 A1* | 7/2005 | Nakamura | ........... | G01C 21/365 701/1 |
| 2007/0070197 A1 | 3/2007 | Akatsuka et al. | | |
| 2007/0072154 A1 | 3/2007 | Akatsuka et al. | | |
| 2009/0009314 A1 | 1/2009 | Taniguchi et al. | | |

(Continued)

FOREIGN PATENT DOCUMENTS

| | | |
|---|---|---|
| DE | 10-2008-028303 A1 | 1/2009 |
| DE | 10-2012-210116 A1 | 12/2012 |

(Continued)

OTHER PUBLICATIONS

Office Action for DE Patent Application No. 10-2017-103287, dated Jun. 27, 2018, received on Jul. 2, 2018, 05 pages of Office Action and 03 pages of English Translation.

*Primary Examiner* — Gordon Liu
(74) *Attorney, Agent, or Firm* — Chip Law Group

(57) ABSTRACT

A display control device for a vehicle includes: a display controller that displays a determined display image including a display of a traveling state of the vehicle on a windshield of the vehicle; a visibility reducing area detector that detects a presence or an absence of a visibility reducing area on the windshield, the visibility reducing area reduces visibility of a driver; and a gaze detector that detects a gaze of the driver. When the visibility reducing area is detected, but the display of the traveling state does not overlap with the visibility reducing area, and the driver keeps the gaze on the visibility reducing area, the display controller displays, on the visibility reducing area, a traveling direction information necessary for driving the vehicle.

20 Claims, 22 Drawing Sheets

(56) References Cited

U.S. PATENT DOCUMENTS

| | | | |
|---|---|---|---|
| 2014/0232869 A1* | 8/2014 | May | H04N 7/18 |
| | | | 348/148 |
| 2014/0321701 A1 | 10/2014 | Halimeh et al. | |
| 2015/0213592 A1* | 7/2015 | Mochizuki | B60K 35/00 |
| | | | 345/632 |
| 2015/0336511 A1 | 11/2015 | Ukeda | |

FOREIGN PATENT DOCUMENTS

| | | |
|---|---|---|
| JP | 2005-069799 A | 3/2005 |
| JP | 2006-078635 A | 3/2006 |
| JP | 2009-214831 A | 9/2009 |
| JP | 2009-248721 A | 10/2009 |
| JP | 2015-163501 A | 9/2015 |

* cited by examiner

FIG. 6
IMAGE 1
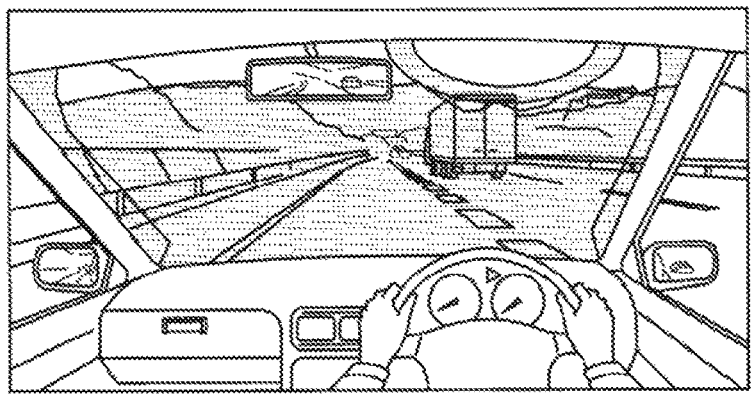
IMAGE 2
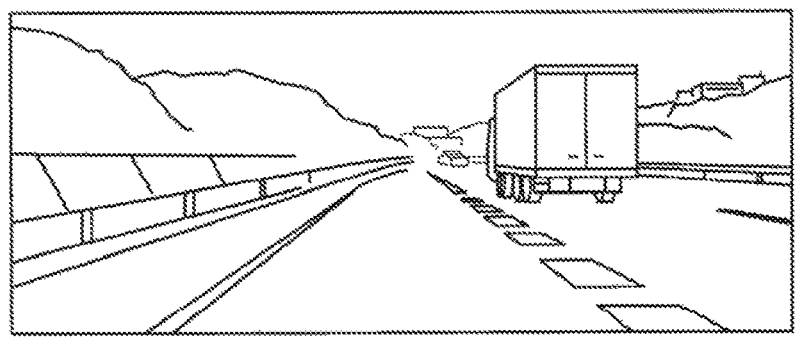
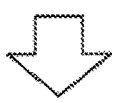 CORRECT DISAGREEMENT ABOUT POSITIONS/FIELD ANGLES
IMAGE 1'
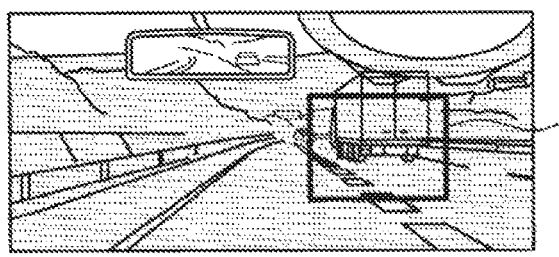 — AREA A
IMAGE 2'
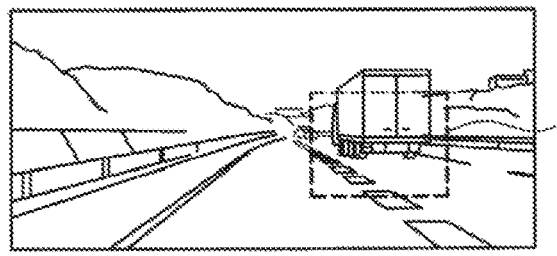 — AREA A

DISPLAY CONTROL DEVICE FOR VEHICLE

CROSS-REFERENCE TO RELATED APPLICATIONS

The present application claims priority from Japanese Patent Application No. 2016-055829 filed on Mar. 18, 2016, the entire contents of which are hereby incorporated by reference.

BACKGROUND

1. Technical Field

The present invention relates to a display control device for a vehicle which controls image display on a windshield.

2. Related Art

Head up display devices (which will also be referred to as "HUD devices") are known each of which displays display images including predetermined images and letters on the windshield of the vehicle. The HUD device shows the driver information by displaying, on the windshield, information of the traveling state of the vehicle such as the vehicle velocity, a virtual image superimposed and displayed on an image of the real world, an image of the shape of the road ahead of the vehicle with respect to the traveling direction, a guidance arrow toward the destination, an image or a letter for showing the road condition, or the like (this display will also be referred to as "HUD display"). If HUD display displayed on the windshield overlaps with rain, fog, sunlight, obstacles, and the like, the HUD display is difficult to watch in some cases. To address this, Japanese Unexamined Patent Application Publication (JP-A) No. 2009-248721, JP-A No. 2015-163501, JP-A No. 2005-69799, and JP-A No. 2006-78635 each disclose the technology of controlling the display position of HUD display in accordance with the visibility of the HUD display.

HUD display includes display (which will also be referred to as "traveling direction information display") for presenting information of the traveling direction of a vehicle such as a preceding vehicle, the shape of a road, a pedestrian, or an obstacle, and display (which will be referred to as "driving information display") for presenting information other than information of the vehicle traveling direction such as vehicle velocity, a guidance arrow to the destination, or traffic congestion information. The driving information display does not directly relate to driving safety even if the visibility of a driver decreases. The traveling direction information display can, however, serve as important display for allowing the driver to learn information of the vehicle traveling direction.

An area that decreases the visibility of HUD display also obscures the driver's field of view. Accordingly, if an area that decreases the visibility of HUD display is formed at a position at which the area obscures the driver's field of view when traveling direction information display is not displayed, it is possible to supplement the driver's field of view by displaying traveling direction information on the area that decreases the visibility.

SUMMARY OF THE INVENTION

It is desirable to provide a novel and improved display control device for a vehicle which can display traveling direction information display to supplement a driver's field of view if an area that reduces the visibility of HUD display obscures the driver's field of view.

An aspect of the present invention provides a display control device for a vehicle, the display control device including: a display controller that displays a determined display image including a display of a traveling state of the vehicle on a windshield of the vehicle; a visibility reducing area detector that detects a presence or an absence of a visibility reducing area on the windshield, the visibility reducing area reduces visibility of a driver; and a gaze detector that detects a gaze of the driver. When the visibility reducing area is detected, but the display of the traveling state does not overlap with the visibility reducing area, and the driver keeps the gaze on the visibility reducing area, the display controller displays, on the visibility reducing area, a traveling direction information necessary for driving the vehicle.

The display controller may make higher or larger one or both of a contrast and a size of the traveling direction information displayed on the visibility reducing area.

The traveling direction information displayed on the visibility reducing area may include a superimposition display image of an information that is visually recognized through the windshield. When a dirty area having dirt on the windshield is detected as the visibility reducing area and the dirty area overlaps with the superimposition display image, the display controller may switch the information of the superimposition display image to a simple display image and display the simple display image in an area in which the simple display image does not overlap with the dirty area, while the driver does not keep the gaze on the superimposition display image.

When a dirty area having dirt on the windshield is detected as the visibility reducing area, the visibility reducing area detector may detect a size of the visibility reducing area.

When the size of the dirty area is greater than or equal to a determined range, the display controller may display the traveling direction information on the visibility reducing area.

When the size of the dirty area is greater than or equal to a determined range, the display controller may execute a warning process.

Another aspect of the present invention provides a display control device for a vehicle, the display control device including: circuitry configured to display a determined display image including a display of a traveling state of the vehicle on a windshield of the vehicle, detect a presence or an absence of a visibility reducing area on the windshield, the visibility reducing area reducing a visibility of a driver, and detect a gaze of the driver. When the visibility reducing area is detected, but the display of the traveling state does not overlap with the visibility reducing area, and the driver keeps the gaze on the visibility reducing area, the circuitry displays, on the visibility reducing area, a traveling direction information necessary for driving the vehicle.

BRIEF DESCRIPTION OF THE DRAWINGS

FIG. 6 is an explanatory diagram illustrating an example of a method for the glare area detector to detect a glare area;

DETAILED DESCRIPTION

Figure 1:
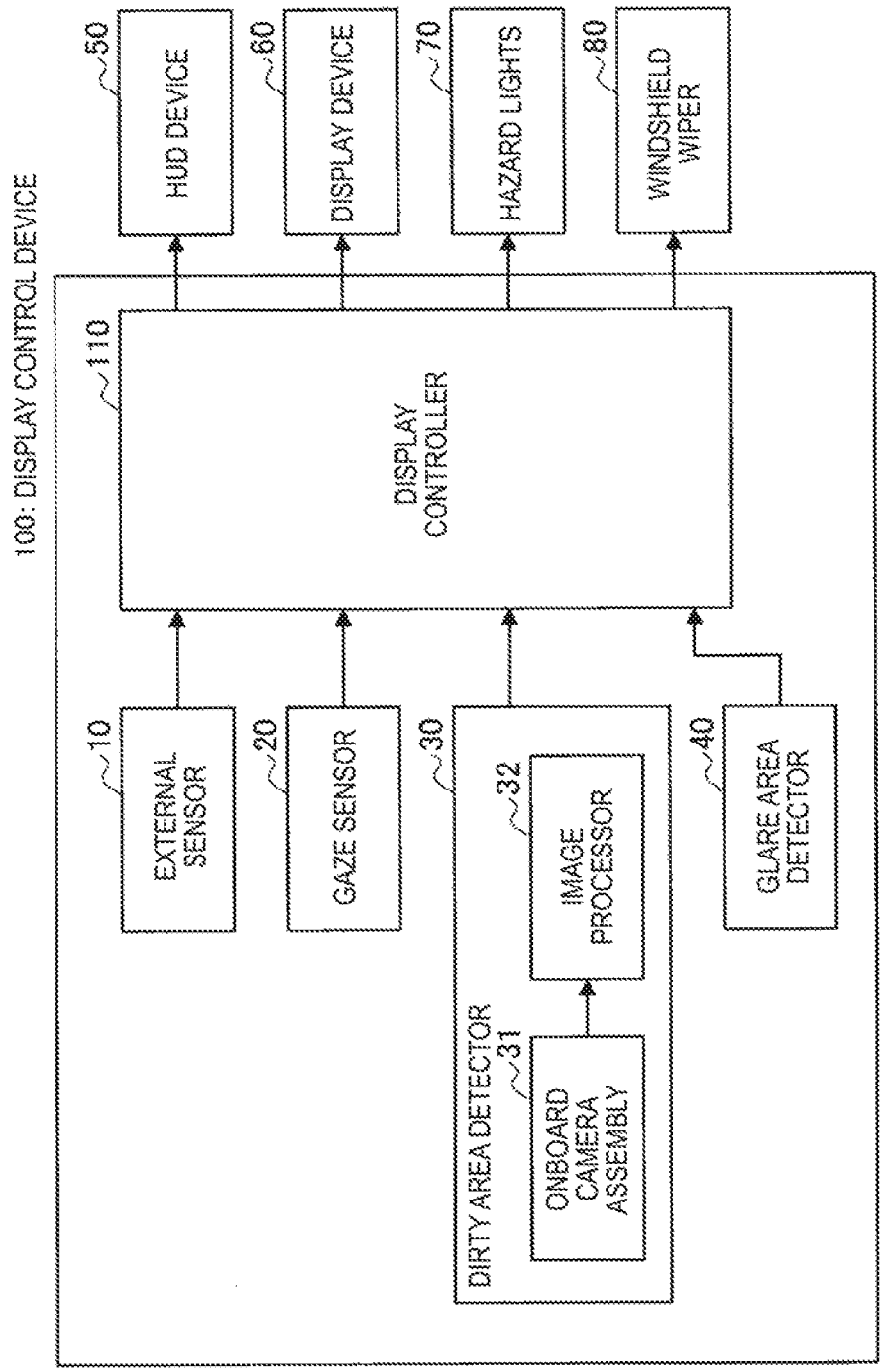
FIG. 1 is a block diagram illustrating a configuration example of a display control device for a vehicle according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

<1. Display System>

First of all, a configuration example of a display system will be described to which a display control device for a vehicle (which will also be referred to simply as "display control device") according to an implementation of the present invention can be applied. FIG. 1 is a block diagram illustrating a configuration example of the display system. The display system includes a display control device 100, a HUD device 50, a display device 60, hazard lights 70, and a windshield wiper 80. The display control device 100 includes an external sensor 10, a gaze sensor 20, a dirty area detector 30, a glare area detector 40, and a display controller 110.

(1-1. HUD Device)

The HUD device 50 displays HUD display on the windshield. The HUD device 50 is provided, for example, to the instrument panel, and projects a display image onto the windshield. The HUD device 50 includes, for example, a light source, an image generator, and a light projector. The HUD device 50 generates a desired image by using the light emitted from the light source, and projects the display image onto the windshield from the light projector. The projected image is reflected by the windshield, and visually recognized by the driver.

In the present implementation, HUD display includes, for example, driving information display in which information for driving the vehicle is displayed. The driving information display may include, for example, information for driving the vehicle such as vehicle velocity V, road information, traffic congestion information, or guide display for the destination. In the present implementation, HUD display includes traveling direction information display in which information of what is ahead of the vehicle with respect to the traveling direction is displayed. The traveling direction information display includes superimposition display in which information of a vehicle, an obstacle, a pedestrian, a road sign, a lane, and the like that can be visually recognized by the driver through the windshield is displayed on the windshield in a superimposition manner. Further, in the present implementation, the traveling direction information display includes simple display in which information of a vehicle, an obstacle, a pedestrian, a road sign, a lane, and the like ahead of the vehicle with respect to the traveling direction is simply displayed.

(1-2. Display Device)

The display device 60 is a device capable of display other than HUD display. The display device 60 can include, for example, a display panel inside the instrument panel, a display device that displays a variety of images, and a display inside an operation panel. In addition, the display device 60 may be another display device that can be visually recognized by the driver.

(1-3. Hazard Lights and Windshield Wiper)

The hazard lights 70 and the windshield wiper 80 may be respectively the known hazard lights and windshield wiper provided to a conventional vehicle.

(1-4. Display Control Device)

The display control device 100 controls HUD display displayed chiefly by the HUD device 50. The display control device 100 according to the present implementation can control the display device 60, the hazard lights 70, and the windshield wiper 80.

(1-4-1. External Sensor)

The external sensor 10 detects information of the area around the vehicle. The external sensor 10 may include one or more sensors that detect, for example, the presence or absence of a preceding vehicle, a pedestrian or an obstacle, the distance to the preceding vehicle, the pedestrian or the obstacle, a lane, or a road sign. As the external sensor 10, for example, at least one of a radar sensor, an ultrasonic sensor, or an imaging camera is used. A sensor signal of the external sensor 10 is transmitted to the display control device 100.

(1-4-2. Gaze Sensor)

The gaze sensor 20 is an instance of a gaze detector, and detects the gaze of the driver. The gaze sensor 20 may be an imaging camera unit that is installed inside the vehicle compartment to face the driver. The imaging camera unit performs image processing on acquired imaging information, and detects the gaze of the driver. In addition, the imaging camera unit detects the position on the windshield on which the driver keeps the gaze, on the basis of the installation position of the camera and the position or shape of the windshield which are stored in advance. A sensor signal of the gaze sensor 20 is transmitted to the display control device 100.

(1-4-3. Dirty Area Detector)

The dirty area detector 30 is an example of a visibility reducing area detector that detects a visibility reducing area that can decrease the visibility of HUD display, and detects a dirty area that is a visibility reducing area on the windshield. The dirty area is an area having dirt such as bird droppings or splashes of mud on the windshield, and can decrease the visibility of HUD display displayed on the windshield. The dirty area can obstruct the driver's field of view. In the example illustrated in FIG. 1, the dirty area detector 30 includes an onboard camera assembly 31 and an image processor 32.

Figure 2:
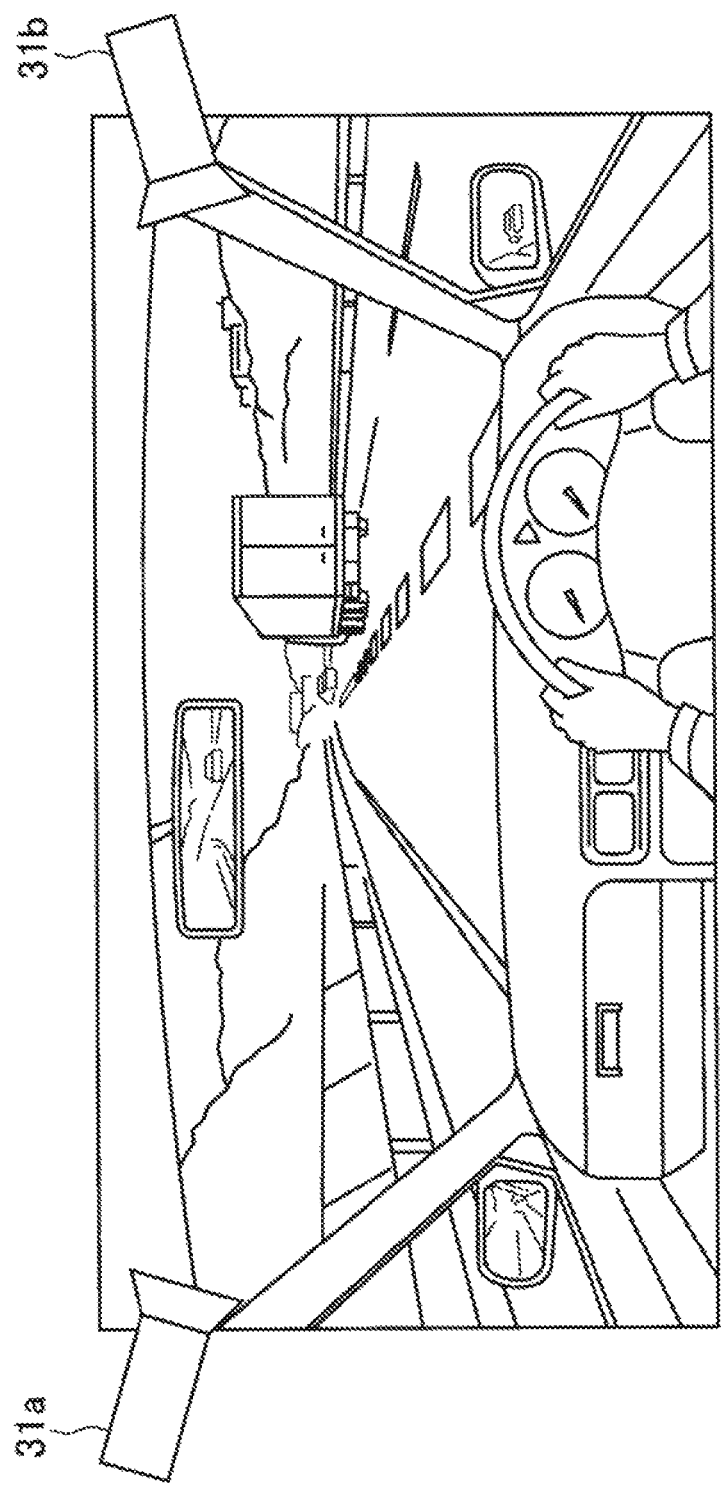
FIG. 2 is an explanatory diagram illustrating an onboard camera assembly (stereo cameras)
Figure 3:
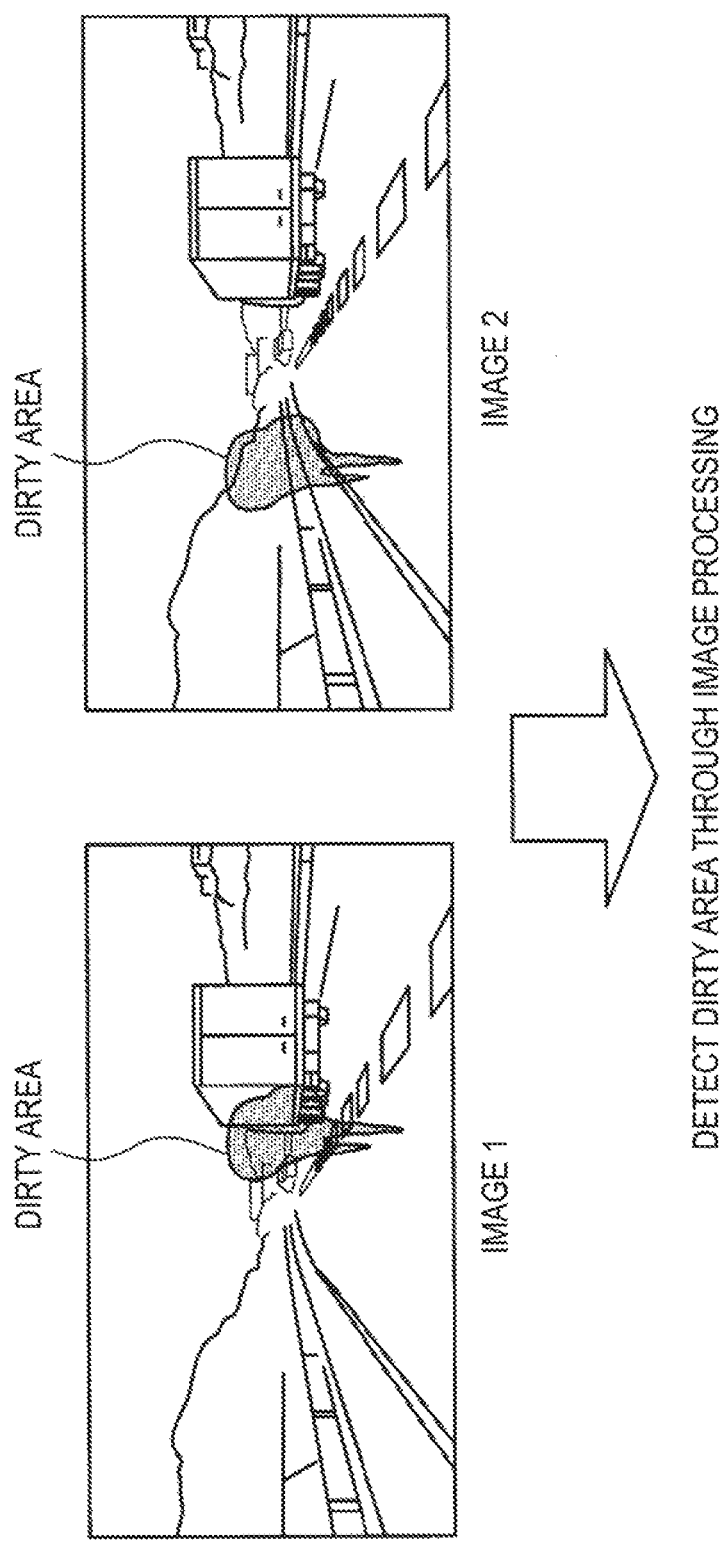
FIG. 3 is an explanatory diagram illustrating an example of a method for a dirty area detector to detect a dirty area.

Each of FIGS. 2 and 3 is an explanatory diagram illustrating a method for the dirty area detector 30 according to the present implementation to detect a dirty area. The onboard camera assembly 31 may be stereo cameras 31a and 31b including a pair of cameras that, for example, image the windshield from the left and right directions. The image processor 32 may be a function implemented, for example, by a microcomputer executing a program. The image processor 32 acquires information of images captured by the stereo cameras 31a and 31b, binarizes the acquired information of each image, for example, into 0 or 1, and monitors a contrast change including depth information with a stereo method. If a contrast change greater than or equal to a preset threshold is observed on coordinates of the windshield, the image processor 32 can determine the area defined by the coordinate group as a dirty area. At this time, the image processor 32 can estimate a size S of the dirty area on the basis of the coordinate group showing a contrast change.

(1-4-4. Glare Area Detector)

The glare area detector 40 is an example of the visibility reducing area detector, and detects a glare area that is a visibility reducing area on the windshield. The glare area is an area in which the driver visually recognizes, for example, the sunlight or illumination light reflected toward the windshield by the instrument panel or the steering wheel. The glare area can decrease the visibility of HUD display displayed on the windshield. The glare area can obstruct the driver's field of view. The glare area detector 40 outputs information of a detected glare area to the display control device 100.

(1-4-4-1. First Example)

Figure 4:
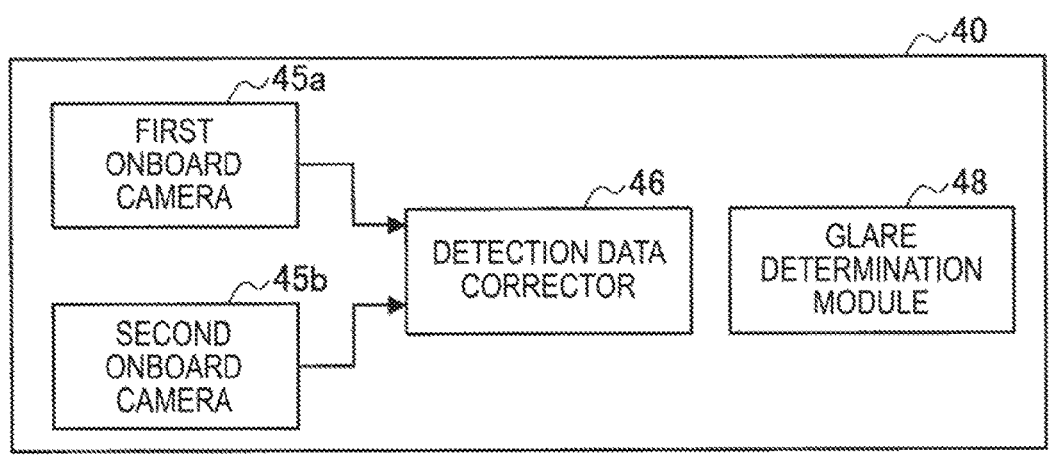
FIG. 4 is a block diagram illustrating an example of a configuration of a glare area detector.
Figure 5:
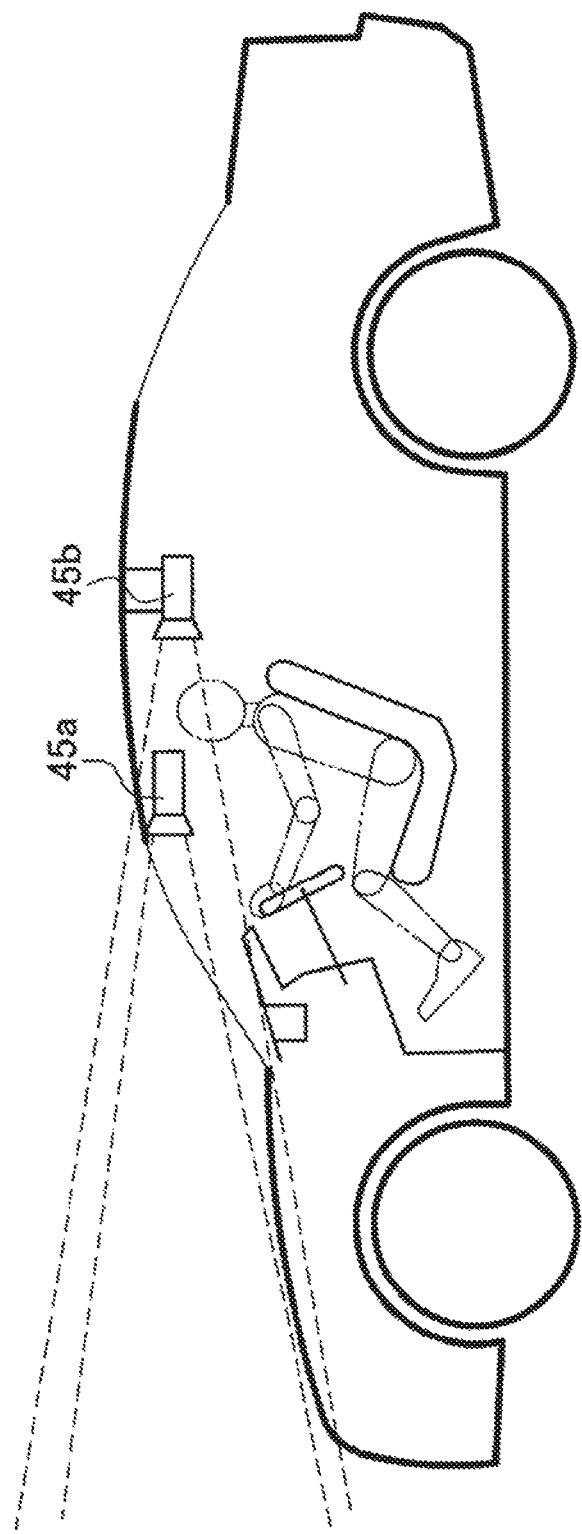
FIG. 5 is an explanatory diagram illustrating a first onboard camera and a second onboard camera.

Each of FIGS. 4 to 6 is an explanatory diagram illustrating a first example of the glare area detector 40. FIG. 4 is a block diagram illustrating a first example configuration of the glare area detector 40. The glare area detector 40 includes a first onboard camera 45a, a second onboard camera 45b, a detection data corrector 46, and a glare determination module 48. FIG. 5 is an explanatory diagram illustrating the installation positions of the first onboard camera 45a and second onboard camera 45b mounted on the vehicle. FIG. 6 is an explanatory diagram illustrating a method for detecting a glare area.

Examples of the first onboard camera 45a and the second onboard camera 45b include cameras that can detect luminance for each pixel of a captured image. The second onboard camera 45b is installed behind the first onboard camera 45a. The first onboard camera 45a is disposed at a position close to the windshield so as to avoid the influence of flare. The second onboard camera 45b is disposed at a position away from the windshield at which it is possible to image flare on the windshield. The first onboard camera 45a and the second onboard camera 45b each detect the luminance of the captured images repeatedly.

The detection data corrector 46 and the glare determination module 48 may be functions implemented, for example, by a microcomputer executing programs. The detection data corrector 46 acquires information of an image 1 and an image 2 captured by the first onboard camera 45a and the second onboard camera 45b, and extracts pixels having the imaged background in common with information of the preset positions and field angles of the first onboard camera 45a and the second onboard camera 45b. The detection data corrector 46 performs image processing so as to resolve the disagreement between the first onboard camera 45a and the second onboard camera 45b about the positions and the field angles, and synchronizes the positions of the extracted images to generate an image 1' and an image 2'. The glare determination module 48 calculates average data of the luminance at the common coordinate points or within the common range for the image 1' and the image 2'. If the difference in the luminance is greater than a preset threshold U, the glare determination module 48 determines that glare occurs at the coordinate points or within the range. It is possible to set, as appropriate, coordinate points on the windshield, ranges on the windshield, time intervals, or the threshold U for computing the luminance.

(1-4-4-2. Second Example)

Figure 7:
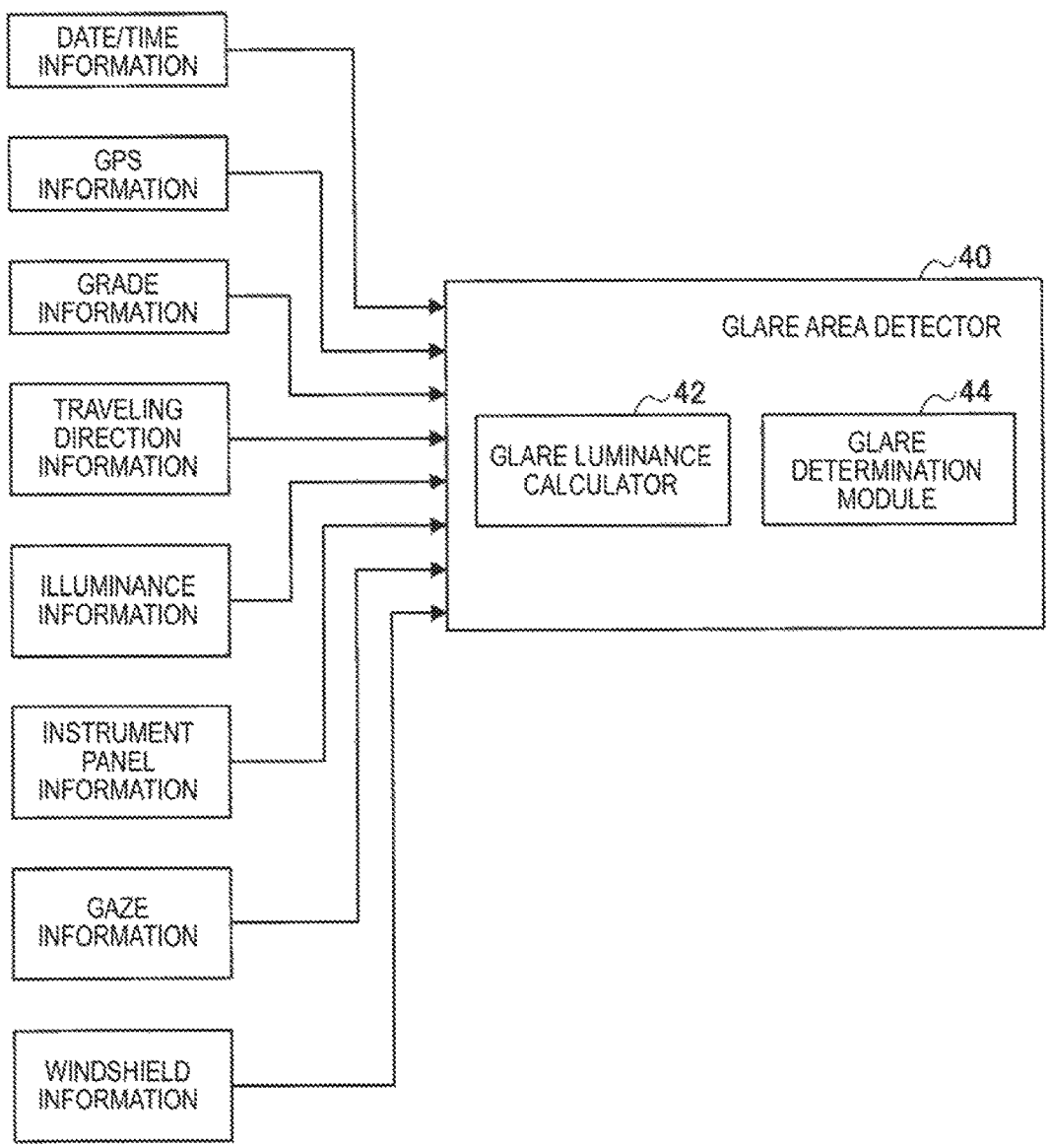
FIG. 7 is a block diagram illustrating another example of a configuration of a glare area detector.
Figure 8:
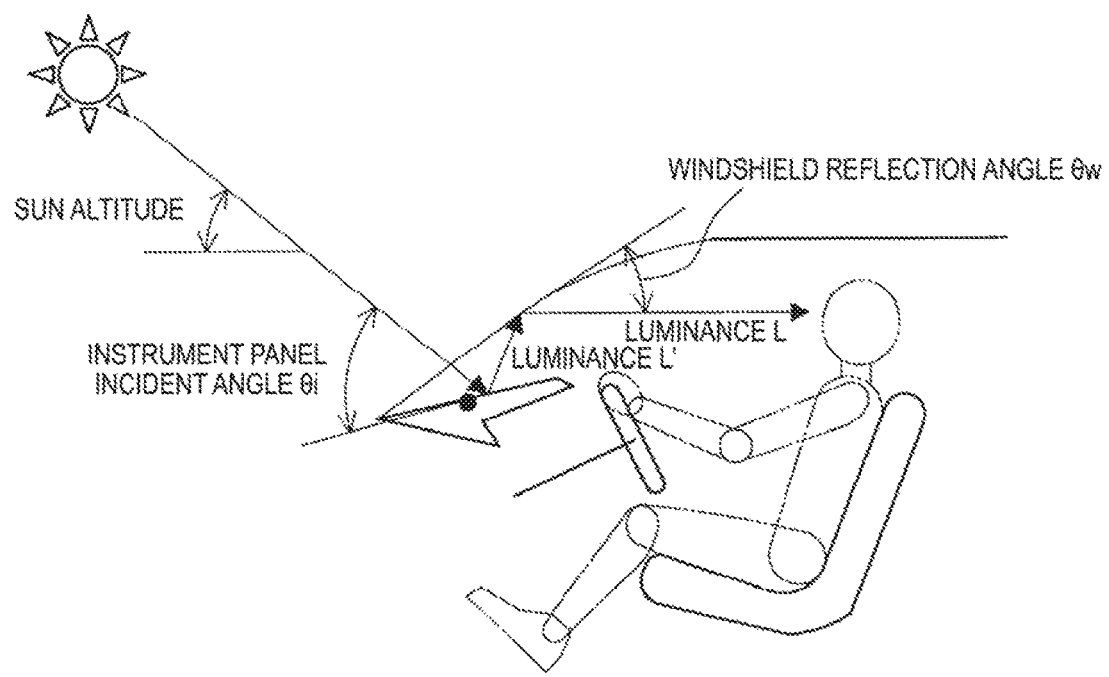
FIG. 8 is an explanatory diagram illustrating another example of a method for the glare area detector to detect a glare area.
Figure 9:
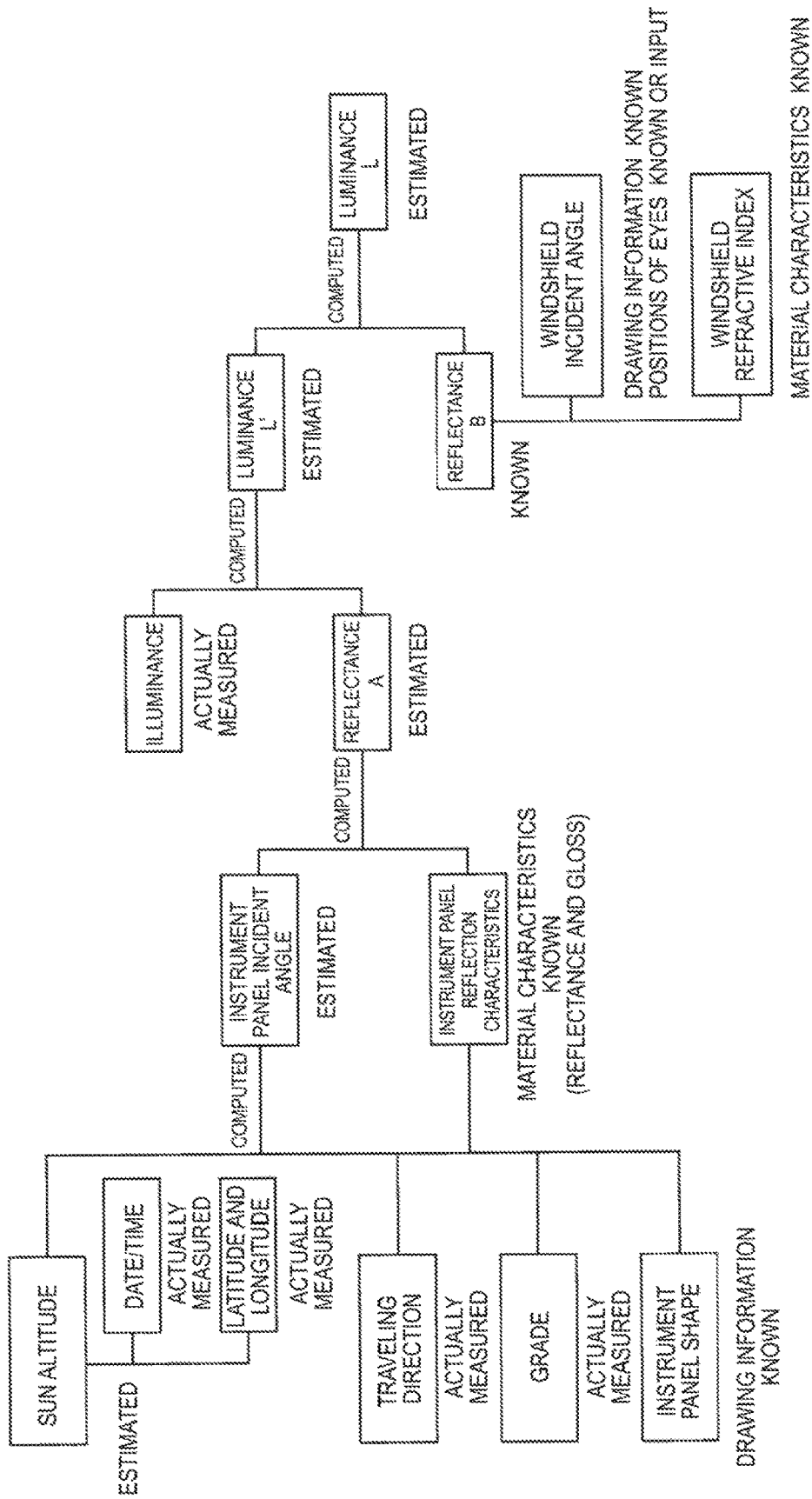
FIG. 9 is an explanatory diagram illustrating another example of a method for the glare area detector to detect a glare area.

Each of FIGS. 7 to 9 is an explanatory diagram illustrating a second example of the glare area detector 40. FIG. 7 is a block diagram illustrating a second example configuration of the glare area detector 40. The glare area detector 40 includes a glare luminance calculator 42 and a glare determination module 44. FIGS. 8 and 9 each describe the overview of a method for detecting a glare area.

The glare luminance calculator 42 and the glare determination module 44 may be functions implemented, for example, by a microcomputer executing programs. The glare luminance calculator 42 estimates predetermined luminance L, for example, with date/time information, global positioning system (GPS) information, grade information, illuminance information, traveling direction information, instrument panel information, windshield information, and gaze information of the driver. The date/time information is measured, for example, by a clock mounted on the vehicle. The GPS information includes information of the latitude and longitude of the vehicle, and is acquired by a GPS device. The grade information is information of the inclination of the vehicle, and is detected by an inclinometer. The illuminance information is information of the illuminance of the light incident on the instrument panel, and is detected, for example, by an illuminometer installed on the instrument panel.

The traveling direction information is information of the traveling direction of the vehicle. The traveling direction information is detected, for example, with a sensor having the detection direction disposed along the front-back direction of the vehicle. The instrument panel information includes information of the three-dimensional shape of the instrument panel, the reflection characteristics of the surface of the instrument panel, and the like. The instrument panel information is stored in advance in a storage element (not illustrated). The windshield information includes information of the three-dimensional shape, reflection characteristics, and the like of the windshield. The windshield information is stored in advance in a storage element (not illustrated). The gaze information is detected by the gaze sensor 20 discussed above.

The glare luminance calculator 42 estimates the sun altitude on the basis of the date/time information and the information of the latitude and longitude of the vehicle. In addition, the glare luminance calculator 42 obtains the angle of the sunlight incident on the instrument panel on the basis of the grade information, and the traveling direction information of the vehicle. Further, the glare luminance calculator 42 calculates a reflectance A of the sunlight on the instrument panel on the basis of information of an incident angle θi of the sunlight and the information of the reflection characteristics of the instrument panel. Further, the glare luminance calculator 42 obtains the illuminance of the sunlight incident on the instrument panel on the basis of the illuminance information, and estimates luminance L' of the light reflected by the instrument panel and incident on the windshield, on the basis of the obtained information of the illuminance and the information of the reflectance A of the instrument panel.

The glare luminance calculator 42 also obtains a reflection angle θw of the light on the windshield which is reflected by the instrument panel and further reflected by the windshield, and visually recognized by the driver, on the basis of the information of the three-dimensional shape of the windshield and the gaze information of the driver. Further, the glare luminance calculator 42 uses information of the refractive index of the windshield along with the obtained information of the reflection angle θw to obtain a reflectance B of the light on the windshield, and estimates the luminance L of the light visually recognized by the driver among the light (luminance=L') incident on the windshield. It is possible to set, as appropriate, coordinate points on the windshield, ranges on the windshield, time intervals, and the threshold U for estimating the luminance L.

When the value of the luminance L obtained by the glare luminance calculator 42 exceeds the preset luminance L, the glare determination module 44 determines that glare that can be visually recognized by the driver occurs on the windshield.

(1-5. Display Controller)

The display controller 110 generates a control command signal of the HUD device 50 on the basis of the information detected by the gaze sensor 20, and the information detected by the dirty area detector 30 and the glare area detector 40. The display controller 110 then outputs the generated control command signal to the HUD device 50. In addition, the display controller 110 of the display control device 100 according to the present implementation also controls the display device 60, the hazard lights 70, and the windshield wiper 80. The display controller 110 chiefly includes a microcomputer, and may be a device that executes various kinds of operational processing by executing programs. As discussed above, the display controller 110 can display driving information display and traveling direction information display of the vehicle as HUD display. The display controller 110 may then execute different control in accordance with whether the detected visibility reducing area is a dirty area or a flare area.

(1-5-1. Case of Detection of Dirty Area)

The detection of a dirty area while driving information display of HUD display is displayed causes the display controller 110 to move the driving information display to a position at which the driving information display does not overlap with the dirty area, if the dirty area overlaps with the driving information display and the driver does not keep the gaze on the driving information display. That is to say, if a dirty area overlaps with driving information display and the visibility of the driving information display decreases, the display controller 110 moves the position of the driving information display while the driver is averting the gaze from the driving information display. This prevents the display position from moving and prevents the movement from annoying the driver while the driver is watching the driving information display.

At this time, the display controller 110 may also move the position of the driving information display within a preset driving information display permission area. The driving information display permission area can be set within the range within which the driver can visually recognize the driving information display without averting the gaze aside much while driving the vehicle. The display controller 110 may further move the driving information display to a position at which the driving information display does not overlap with a dirty area if the size S of the dirty area falls within a predetermined range. If the size S of the dirty area is large, the display controller 110 prioritizes the display of traveling direction information necessary for driving the vehicle because there is great necessity to secure the driver driving safety. Meanwhile, if the size S of the dirty area is small, the display controller 110 maintains the position of the driving information display because there is little necessity to move the position of the driving information display.

The detection of a dirty area while driving information display is displayed causes the display controller 110 to display traveling direction information display on the dirty area, if the dirty area does not overlap with the driving information display and the driver keeps the gaze on the dirty area. That is to say, even if a dirty area does not overlap with driving information display, the driver keeping the gaze on the dirty area is supposed to mean that the driver's field of view is obstructed by the dirty area. The display controller 110 thus displays traveling direction information display on the dirty area. The traveling direction information display here may be either one of superimposition display and simple display. This supplements the driver's field of view, and it is possible to prevent decrease in driving safety.

The detection of a dirty area while the superimposition display of traveling direction information display is displayed causes the display controller 110 to switch the superimposition display to simple display and to move the position of the simple display overlapping with the dirty area to the outside of the dirty area, if the dirty area overlaps with the superimposition display and the driver does not keep the gaze on the superimposition display. This eliminates the chance that the driver watches superimposition display with the visibility decreased, and makes the driver feel less strange.

The detection of a dirty area while HUD display is displayed causes the display controller 110 to make one or both of the contrast and size of the HUD display overlapping with the dirty area higher or larger, if the dirty area overlaps with the HUD display and the driver keeps the gaze on the HUD display. That is to say, if a dirty area overlaps with HUD display, the display controller 110 makes the contrast or size of the HUD display higher or larger to increase the visibility while the driver keeps the gaze on the HUD display. This can prevent the visibility of the HUD display from decreasing before the HUD display is moved. Additionally, "contrast" can herein include one or both of luminance and chrominance.

If the size of a dirty area is considerably large, the display controller 110 may issue warning to the driver or the outside of the vehicle. For example, the display controller 110 may turn on the hazard lights 70 to inform the following vehicle or the like of the malfunction of the vehicle, or display the failure to secure the field of view on the display device 60 such as the instrument panel in the vehicle compartment to issue warning to the driver.

Further, if a dirty area is detected, the display controller 110 attempts to remove the dirty area or to make the dirty area smaller by operating the windshield wiper 80. This can prevent HUD display from decreasing in visibility due to the overlap with a dirty area, or secure the driver high visibility.

(1-5-2. Case of Detection of Glare Area)

The detection of a glare area while driving information display of HUD display is displayed causes the display controller 110 to move the driving information display to a position at which the driving information display does not overlap with the glare area, if the glare area overlaps with the driving information display and the driver does not keep the gaze on the driving information display. That is to say, if a glare area overlaps with driving information display and the visibility of the driving information display decreases, the display controller 110 moves the position of the driving information display while the driver is averting the gaze from the driving information display. This prevents the display position from moving and prevents the movement from annoying the driver while the driver is watching the driving information display. Similar to the time of the detection of a dirty area, at this time, the display controller 110 may also move the position of the driving information display within a preset driving information display permission area.

The detection of a glare area causes the display controller 110 to display traveling direction information display on the glare area, if the glare area does not overlap with a driving information display area and the driver keeps the gaze on the glare area. The traveling direction information display here may be either one of superimposition display and simple display. This supplements the driver's field of view even in the condition in which it is difficult to secure the driver's field of view. Similar to the detection of a dirty area, the detection of a glare area while HUD display is displayed causes the display controller 110 to make one or both of the contrast and size of the HUD display overlapping with the glare area higher or larger, if the glare area overlaps with the HUD display and the driver keeps the gaze on the HUD display.

(1-5-3. Case of Windshield Wiper in Operation)

If HUD display overlaps with a windshield wiper wiped area other than a dirty area and a glare area while the windshield wiper 80 is in operation, the visibility of the HUD display would decrease. Accordingly, the display controller 110 executes control to prevent decrease in the visibility of the HUD display. If the windshield wiper 80 is in operation and the driver does not keep the gaze on the driving information display of HUD display while the driving information display is displayed, the display controller 110 moves the position of the driving information display to the outside of the windshield wiper wiped area. This prevents the display position from moving and prevents the movement from annoying the driver while the driver is watching the driving information display. The position may be preset to which the driving information display is to be moved.

In addition, the display controller 110 lowers the contrast of HUD display overlapping with the windshield wiper blade if the windshield wiper 80 is in operation and the driver keeps the gaze on the HUD display while the HUD display is displayed. For example, among HUD display displayed on the windshield, the display controller 110 lowers the contrast of the range of HUD display overlapping with the windshield wiper blade on the basis of information of the shape of the windshield wiper blade, information of the rotation angle of the windshield wiper blade, and the display position of the HUD display which are stored in advance. That is to say, the range of the HUD display to be lowered in contrast is moved in accordance with the rotation of the windshield wiper blade.

The range of HUD display overlapping with the windshield wiper blade has higher contrast and is easier to watch than the range of the HUD display not overlapping with the windshield wiper blade. Lowering the contrast of the range of the HUD display overlapping with the windshield wiper blade thus reduces the uneven contrast of the HUD display to increase the visibility.

<2. Display Control Methods>

The configuration example of the display system including the display control device 100 according to the present implementation has been described so far. The following describes examples of display control methods that are executed by the display control device 100. Additionally, the display control device 100 may be capable of executing one or more of display control methods according to the following first to fourth examples.

(2-1. First Example)

Figure 10:
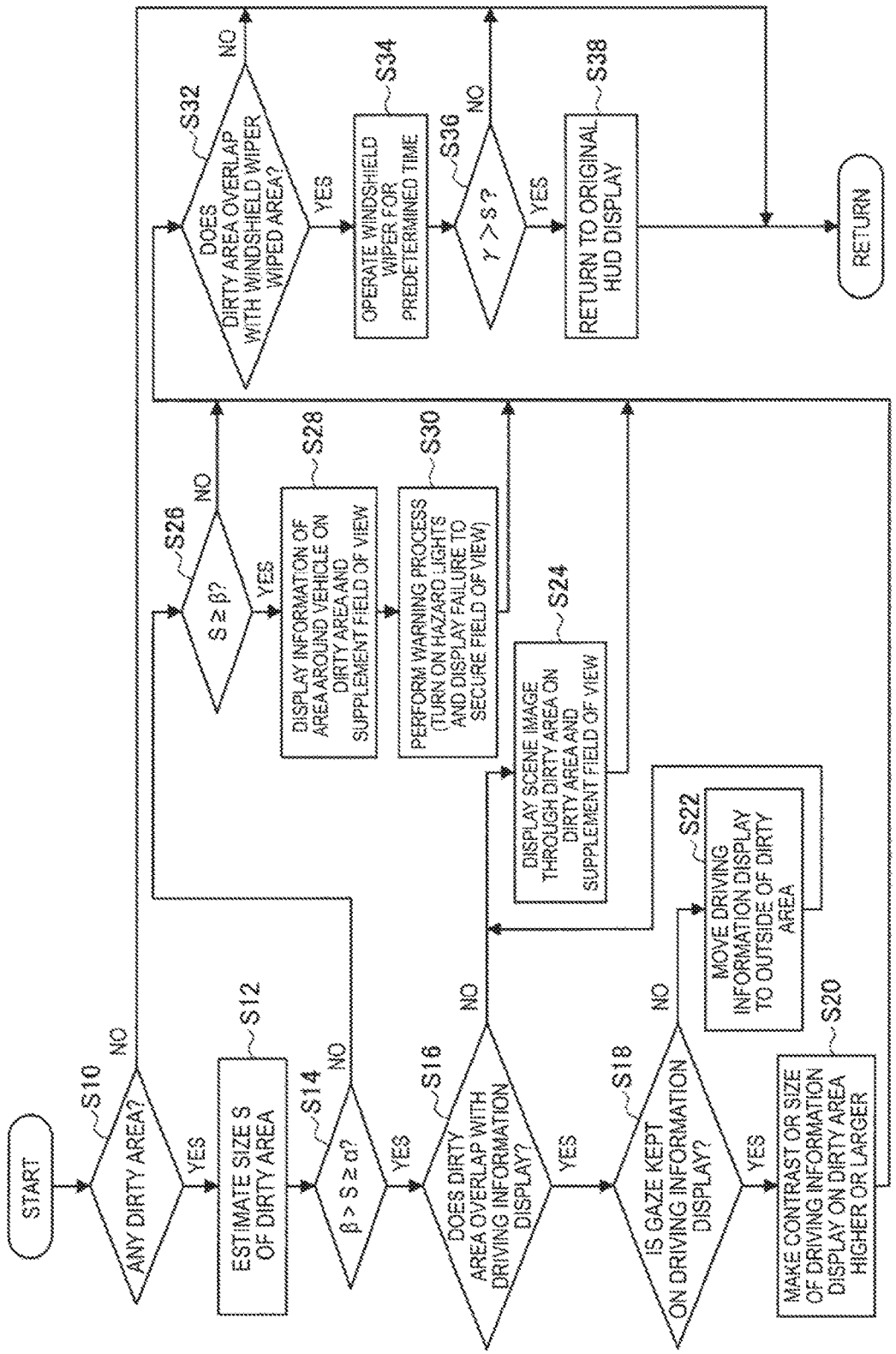
FIG. 10 is a flowchart illustrating a HUD display control method that avoids a dirty area.

FIG. 10 is a flowchart illustrating the display control method according to the first example. FIG. 10 illustrates control processing for reducing the influence that a dirty area has on the visibility of HUD display for the driver or the driver's field of view while the HUD display is displayed. First of all, in step S10, the dirty area detector 30 determines whether there is a dirty area on the windshield. For example, the dirty area detector 30 may determine the presence or absence of a dirty area by performing image processing on information of images of the windshield captured by the stereo cameras 31*a* and 31*b* as illustrated in FIGS. 2 and 3.

If no dirty area is detected (S10: No), the dirty area detector 30 finishes the present routine and returns to the start. Meanwhile, if a dirty area is detected (S10: Yes), the dirty area detector 30 estimates the size S of the dirty area in step S12. For example, the dirty area detector 30 may estimate the size S of the dirty area on the basis of the range defined by coordinate groups of images of the windshield captured by the stereo cameras 31*a* and 31*b* and having a contrast change.

Next, in step S14, the display controller 110 determines whether the estimated size S of the dirty area is within a predetermined preset range ($\beta > S \geq \alpha$). The upper limit $\beta$ of the predetermined range can be set at the size at which it can be determined that a dirty area considerably obstructs the driver's field of view. For example, the upper limit $\beta$ of the predetermined range can be set at 30% of the area of the entire windshield. The lower limit $\alpha$ of the predetermined range can be set at the size at which it can be determined that a dirty area is formed, but the dirty area has little influence on the driver's field of view. For example, the lower limit $\alpha$ of the predetermined range can be set at 5% of the area of the entire windshield. However, the upper limit β and lower limit α of the predetermined range may be different in accordance with the position of a dirty area formed on the windshield. The values of the upper limit β and the lower limit α may be smaller, for example, within the range within which the dirty area is easy to come into the driver's field of view or preset driving information display can be displayed.

If the size S of the dirty area is within the predetermined range (S14: Yes), the display controller 110 determines in step S16 whether the dirty area overlaps with driving information display. For example, the display controller 110 may determine whether the coordinate group on the windshield at which the dirty area is detected overlaps with the display area of the driving information display. If the dirty area overlaps with the driving information display (S16: Yes), the display controller 110 determines in step S18 whether the driver keeps the gaze on the driving information display. For example, the display controller 110 may determine whether the position of the gaze of the driver detected by the gaze sensor 20 overlaps with the display area of the driving information display.

If the driver keeps the gaze on the driving information display (S18: Yes), the display controller 110 makes one or both of the contrast and size of the driving information display higher or larger, moderates decrease in the visibility of the driving information display for the driver, and proceeds to step S32. Meanwhile, if the driver does not keep the gaze on the driving information display (S18: No), the display controller 110 moves the driving information display to the outside of the dirty area in step S22. The display controller 110 may display the driving information display within the preset driving information display permission area.

After the process of step S22 is finished, or if the dirty area does not overlap with the driving information display in step S16 (S16: No), the display controller 110 displays an image of the scene from the driver through the dirty area on the dirty area in step S24, and proceeds to step S32. The display controller 110 may identify the scene that can be visually recognized by the driver through the dirty area, for example, on the basis of imaging information detected by the onboard camera assembly 31 and information of the gaze of the driver, and display the identified scene on the dirty area. This allows the driver to recognize the scene through the dirty area, and can supplement the driver's field of view.

Figure 11:
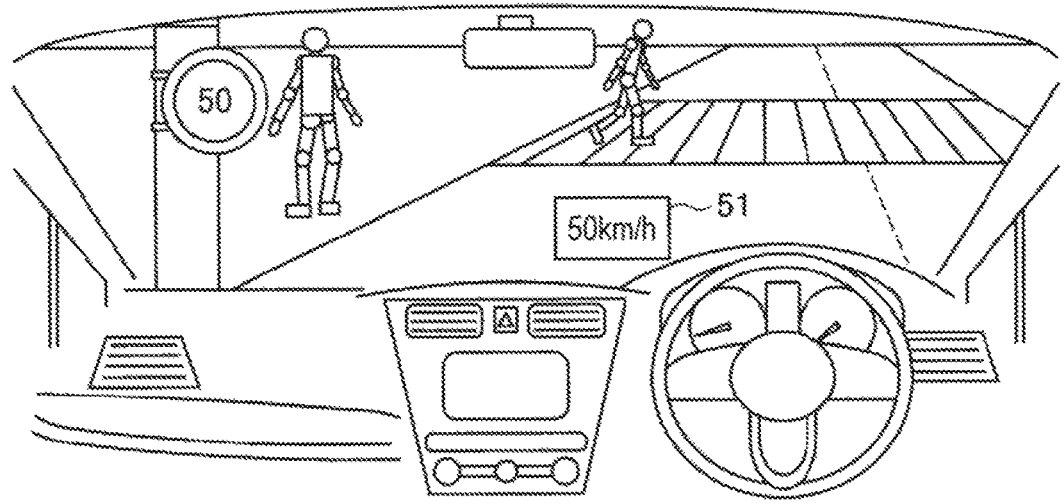
FIG. 11 is an explanatory diagram illustrating an example of HUD display with no dirty area.
Figure 12:
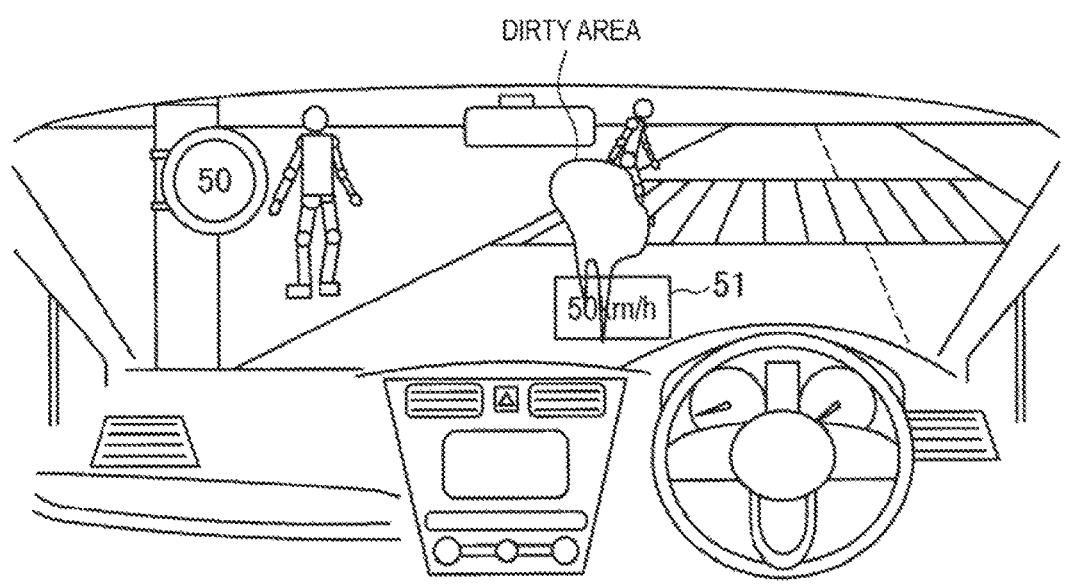
FIG. 12 is an explanatory diagram illustrating that a small dirty area overlaps with HUD display.

FIGS. 11 to 14 describe the processes of steps S20, S22, and S24, and schematically illustrate the driver's field of view. FIG. 11 illustrates the driver's field of view with no dirty area on the windshield. The example of FIG. 11 illustrates driving information display 51 at a lower position on the windshield between the center and driver's seat side. There are pedestrians ahead of the vehicle. FIG. 12 illustrates that a dirty area having a size within a predetermined range (β>S≥α) is formed on the windshield so as to overlap with the driving information display 51.

Figure 13:
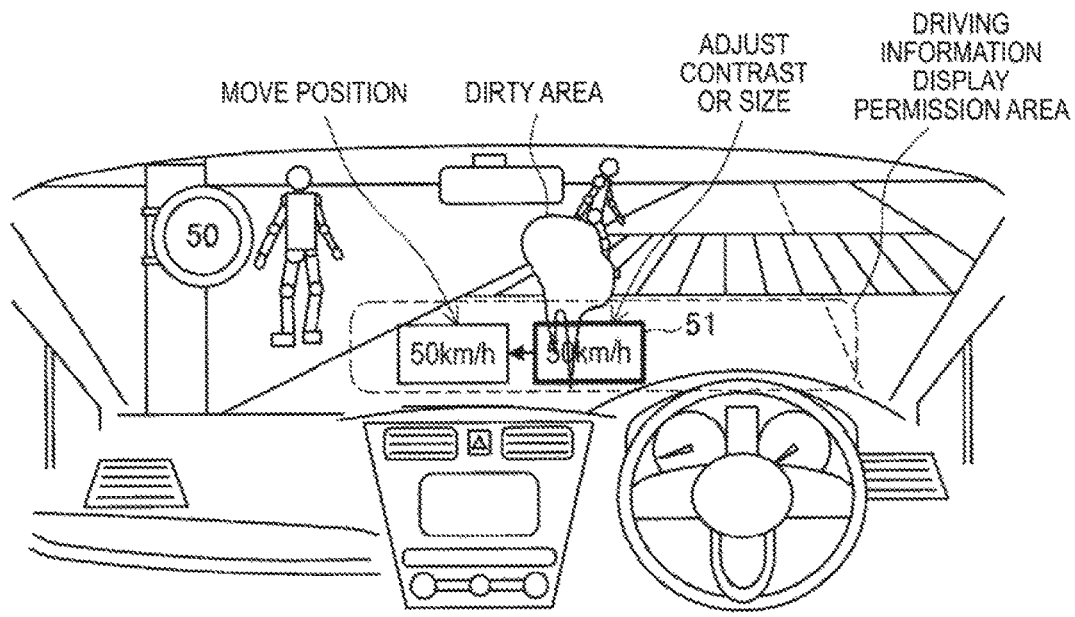
FIG. 13 is an explanatory diagram illustrating an example in which HUD display is moved.
Figure 14:
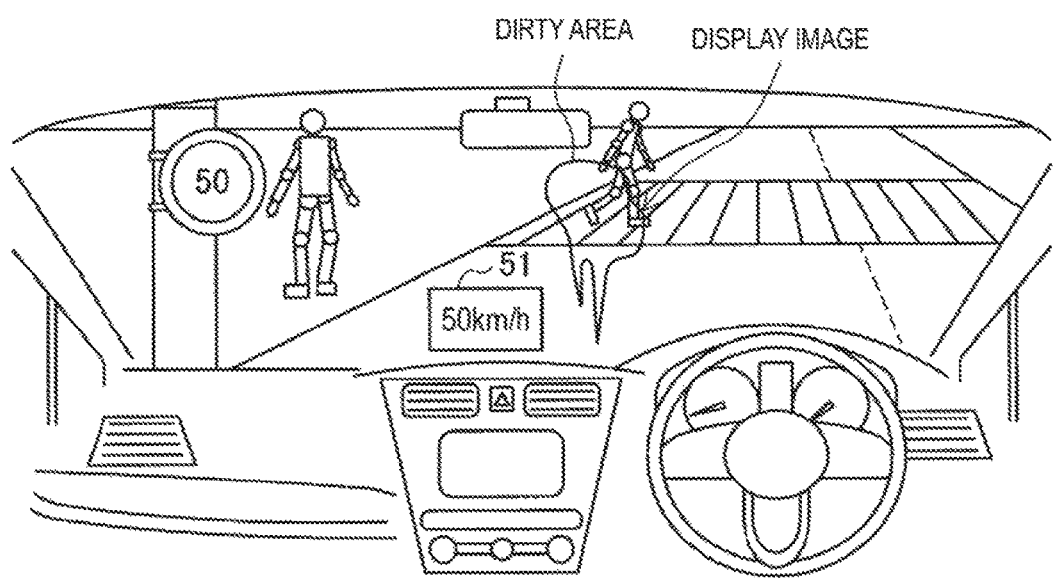
FIG. 14 is an explanatory diagram illustrating an example in which an image of a traveling direction as seen through a dirty area is displayed.

If the size S of the dirty area is within the predetermined range and the driving information display 51 overlaps with the dirty area, the display controller 110 makes one or both of the contrast and size of the driving information display 51 higher or larger without moving the position as illustrated in FIG. 13 while the driver keeps the gaze on the driving information display 51. This moderates decrease in the visibility of the driving information display 51 for the driver. Meanwhile, if the driver does not keep the gaze on the driving information display 51, the display controller 110 moves the position of the driving information display 51 within the driving information display permission area. This eliminates overlap between the driving information display 51 and the dirty area without annoying the driver. The display controller 110 moves the driving information display 51 to a position at which the driving information display 51 does not overlap with the dirty area, and then displays an image of the scene through the dirty area on the dirty area as illustrated in FIG. 14. The example of FIG. 14 superimposes and displays images of a pedestrian and a crosswalk on a dirty area. This can supplement the driver's field of view and moderate decrease in the safety of the vehicle even if a dirty area is formed.

If the size S of the dirty area is not within the predetermined range in step S14 (S14: No), the display controller 110 determines in step S26 whether the size S of the dirty area is greater than or equal to the upper limit β. If the size S of the dirty area is less than the upper limit β (S26: No) or the size of the dirty area is less than the lower limit α, the display controller 110 proceeds to step S32. Meanwhile, if the size S of the dirty area is greater than or equal to the upper limit β (S26: Yes), the display controller 110 displays traveling direction information necessary for driving the vehicle on the dirty area in step S28. For example, the display controller 110 may simply display information of the lanes, vehicles, pedestrians, road signs, obstacles, and the like ahead of the vehicle differently from the images of the scene through the dirty area which are displayed in step S24. This can supplement the driver's field of view.

Figure 15:
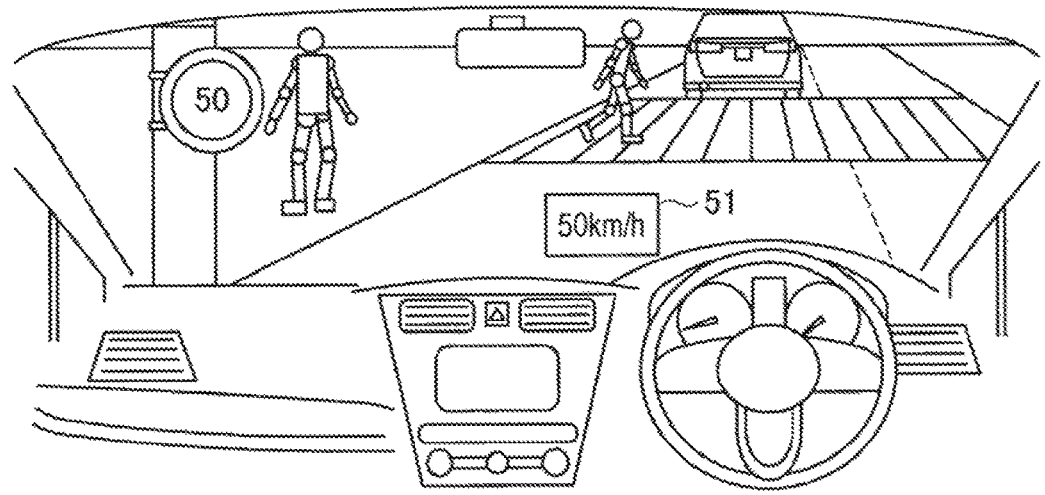
FIG. 15 is an explanatory diagram illustrating an example of HUD display with no dirty area.
Figure 16:
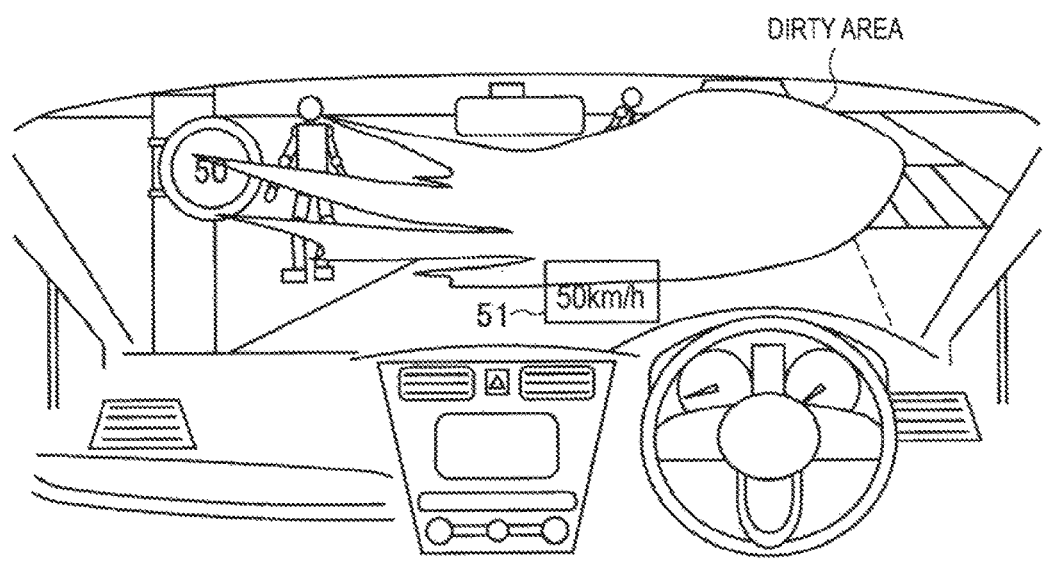
FIG. 16 is an explanatory diagram illustrating that a large dirty area overlaps with HUD display.
Figure 17:
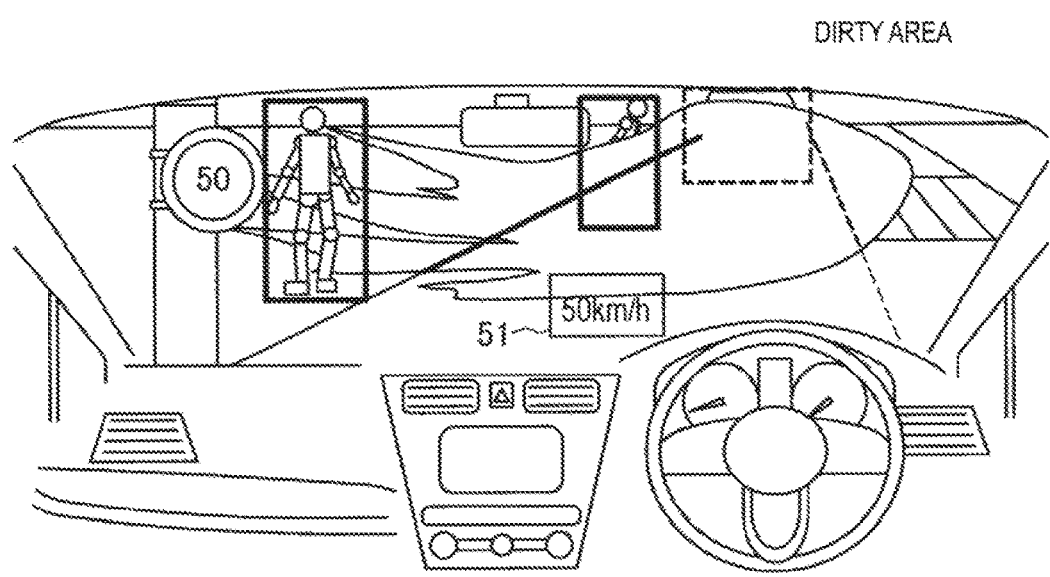
FIG. 17 is an explanatory diagram illustrating an example in which traveling direction information is presented on a dirty area.

FIGS. 15 to 17 describe the process of step S28, and schematically illustrate the driver's field of view. FIG. 15 illustrates the driver's field of view with no dirty area on the windshield. The example of FIG. 15 illustrates driving information display 51 at a lower position on the windshield between the center and driver's seat side. There are a preceding vehicle and pedestrians ahead of the vehicle. FIG. 16 illustrates that a dirty area having a size greater than or equal to the upper limit β (S≥β) is formed on the windshield.

If the size of the dirty area is greater than or equal to the upper limit β, the display controller 110 preferentially secures the driver safety of driving the vehicle and displays traveling direction information necessary for driving the vehicle on the dirty area as illustrated in FIG. 17. The example of FIG. 17 illustrates pedestrians in solid-line boxes, and a preceding vehicle in a dashed-line box. The shoulder of a road is illustrated by a solid line, while a lane is illustrated by a dashed line. The driver can thus rely on traveling direction information simply displayed on a dirty area to secure the driving safety until the dirty area is removed. Traveling direction information of the vehicle may include other information such as traffic lights, road signs, and obstacles in addition to the examples illustrated in FIG. 17.

The display controller 110 displays the traveling direction information of the vehicle on the dirty area in step S28, and then performs a warning process in step S30. For example, the display controller 110 may turn on the hazard lights 70 to issue warning to nearby vehicles or cause the display device 60 in the vehicle compartment to display warning to issue warning to the driver. The display controller 110 performs the warning process, and then proceeds to step S32.

In step S32, the display controller 110 determines whether the dirty area overlaps with the windshield wiper wiped area. For example, the display controller 110 may determine whether the coordinate group on the windshield at which the dirty area is detected overlaps with the windshield wiper wiped area stored in advance. If the dirty area does not overlap with the windshield wiper wiped area (S32: No), the display controller 110 finishes the present routine and returns to the start. Meanwhile, if the dirty area overlaps with the windshield wiper wiped area (S32: Yes), the display controller 110 attempts to remove the dirty area in step S34 by operating the windshield wiper 80 for a given time.

Next, in step S36, the display controller 110 determines whether the size S of the dirty area falls below a preset reference value γ. The reference value γ is a still smaller value than the lower limit α, and set at the size at which it can be determined that the visibility is not influenced. The reference value γ may be zero. If the size S of the dirty area is greater than or equal to the reference value γ (S36: No), the display controller 110 finishes the present routine and returns to the start. Meanwhile, if the size S of the dirty area falls below the reference value γ (S36: Yes), the display controller 110 brings the HUD display back to the initial condition in step S38. That is to say, if the position of the driving information display has been moved, the display controller 110 displays the driving information display at the original position. If the traveling direction information of the vehicle has been displayed on the dirty area, the display controller 110 stops the display. Afterwards, the display controller 110 finishes the present routine and returns to the start.

The display control method according to the first example makes one or both of the contrast and size of the driving information display 51 higher or larger to moderate decrease in the visibility of the windshield for the driver if a dirty area is formed on the windshield and the driver keeps the gaze on the driving information display 51. If the driver does not keep the gaze on the driving information display 51, the display control method according to the first example moves the driving information display 51 to a position at which the driving information display 51 does not overlap with the dirty area within the driving information display permission area to moderate decrease in the visibility of the driving information display 51 for the driver. That is to say, the display control device 100 does not move the position of the driving information display 51 while the driver is gazing at the driving information display 51. Accordingly, it is possible to make the driver feel less annoyed.

If a dirty area is formed on the windshield, but the dirty area does not overlap with the driving information display 51 with the gaze of the driver kept on the dirty area, the display control method according to the first example displays the traveling direction information display on the dirty area to supplement the driver's field of view. This thus moderates decrease in the driver's driving safety.

(2-2. Second Example)

Figure 18:
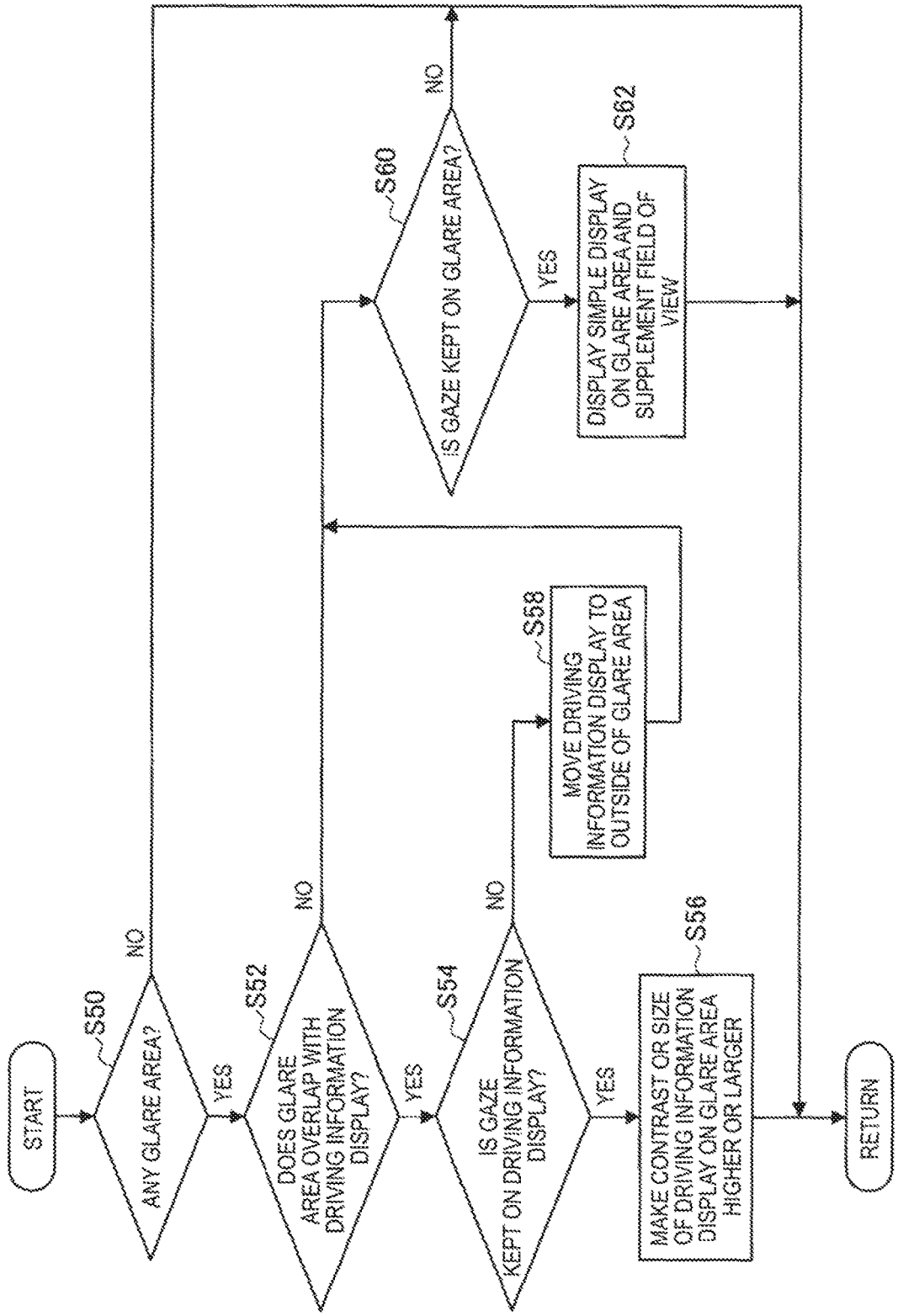
FIG. 18 is a flowchart illustrating a HUD display control method that reduces influence of a glare area.

FIG. 18 is a flowchart illustrating the display control method according to the second example. FIG. 18 illustrates control processing for reducing the influence that a glare area has on the visibility of HUD display for the driver or the driver's poor field of view while the HUD display is displayed. First of all, in step S50, the glare area detector 40 determines whether there is a glare area on the windshield. For example, the glare area detector 40 may determine the presence or absence of a glare area by performing image processing on information of images of the windshield captured by the first onboard camera 45a and the second onboard camera 45b as illustrated in FIGS. 4 to 6. Alternatively, the glare area detector 40 may determine the presence or absence of a glare area on the basis of information of the sun altitude, the facing direction of the vehicle, the illuminance of the sunlight incident on the instrument panel, or the like as illustrated in FIGS. 7 to 9.

If no glare area is detected (S50: No), the glare area detector 40 finishes the present routine and returns to the start. Meanwhile, if a glare detection is detected (S50: Yes), the display controller 110 determines in step S52 whether the glare area overlaps with driving information display. For example, the display controller 110 may determine whether the coordinate group on the windshield at which the glare area is detected overlaps with the display area of the driving information display. If the glare area overlaps with the driving information display (S52: Yes), the display controller 110 determines in step S54 whether the driver keeps the gaze on the driving information display. For example, the display controller 110 may determine whether the position of the gaze of the driver detected by the gaze sensor 20 overlaps with the display area of the driving information display.

If the driver keeps the gaze on the driving information display (S54: Yes), the display controller 110 makes one or both of the contrast and size of the driving information display higher or larger, moderates decrease in the visibility of the driving information display for the driver, finishes the present routine, and returns to the start. Meanwhile, if the driver does not keep the gaze on the driving information display (S54: No), the display controller 110 moves the driving information display to the outside of the glare area in step S58. The display controller 110 may display the driving information display within the preset driving information display permission area.

After the process of step S58 is finished, or if the glare area does not overlap with the driving information display in step S52 (S52: No), the display controller 110 determines in step S60 whether the driver keeps the gaze on the glare area. If the driver does not keep the gaze on the glare area (S60: No), the display controller 110 finishes the present routine and returns to the start. Meanwhile, if the driver keeps the gaze on the glare area (S60: Yes), the display controller 110 simply displays traveling direction information of the vehicle on the glare area in step S62. Different from dirty areas, glare areas do not necessarily obstruct part of the field of view. However, glare areas make the scene through the windshield difficult to see in some cases. Accordingly, the display controller 110 supplements the driver's field of view by simply displaying the traveling direction information of the vehicle, and facilitates the driver to recognize a pedestrian, a preceding vehicle, and the like. Afterwards, the display controller 110 finishes the present routine and returns to the start.

Figure 19:
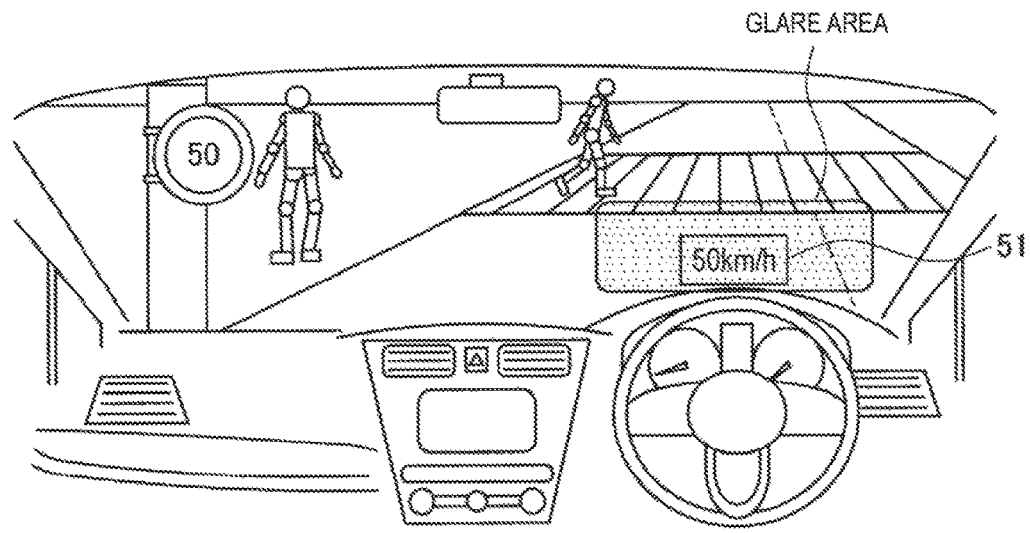
FIG. 19 is an explanatory diagram illustrating that a glare area overlaps with HUD display.
Figure 20:
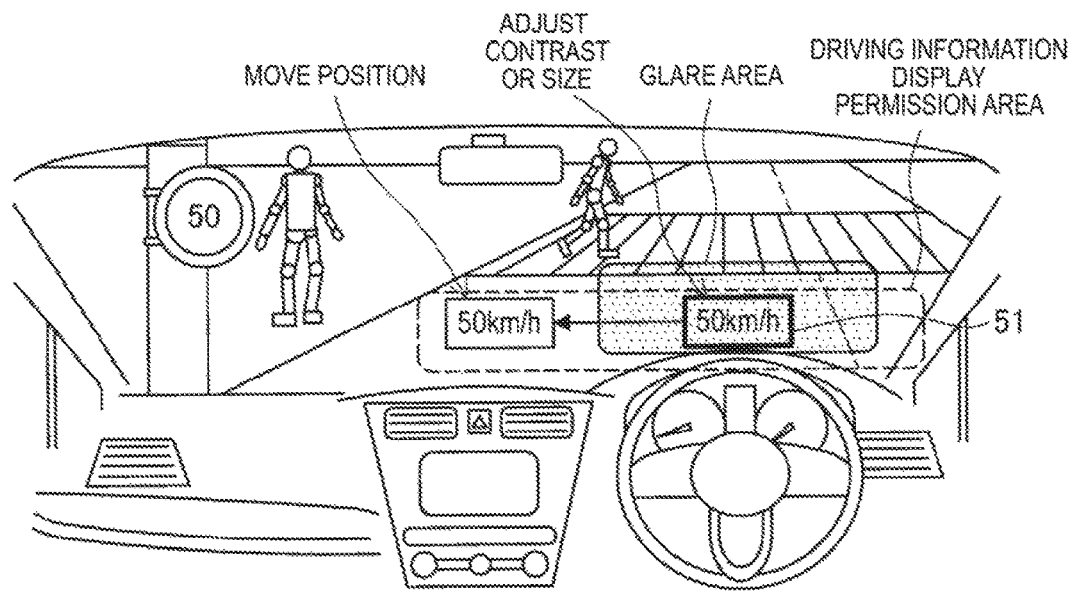
FIG. 20 is an explanatory diagram illustrating an example in which HUD display is moved.

FIGS. 19 to 22 describe the processes of steps S56, S58, and S62, and schematically illustrate the driver's field of view. FIG. 19 illustrates that a glare area is formed so as to overlap with the driving information display 51 displayed on the windshield. There are pedestrians ahead of the vehicle. If the driving information display 51 overlaps with the glare area, the display controller 110 makes one or both of the contrast and size of the driving information display 51 higher or larger without moving the driving information display 51 as illustrated in FIG. 20 while the driver keeps the gaze on the driving information display 51. This moderates decrease in the visibility of the driving information display 51 for the driver. Meanwhile, if the driver does not keep the gaze on the driving information display 51, the display controller 110 moves the position of the driving information display 51 within the driving information display permission area. This eliminates overlap between the driving information display 51 and the glare area without annoying the driver.

Figure 21:
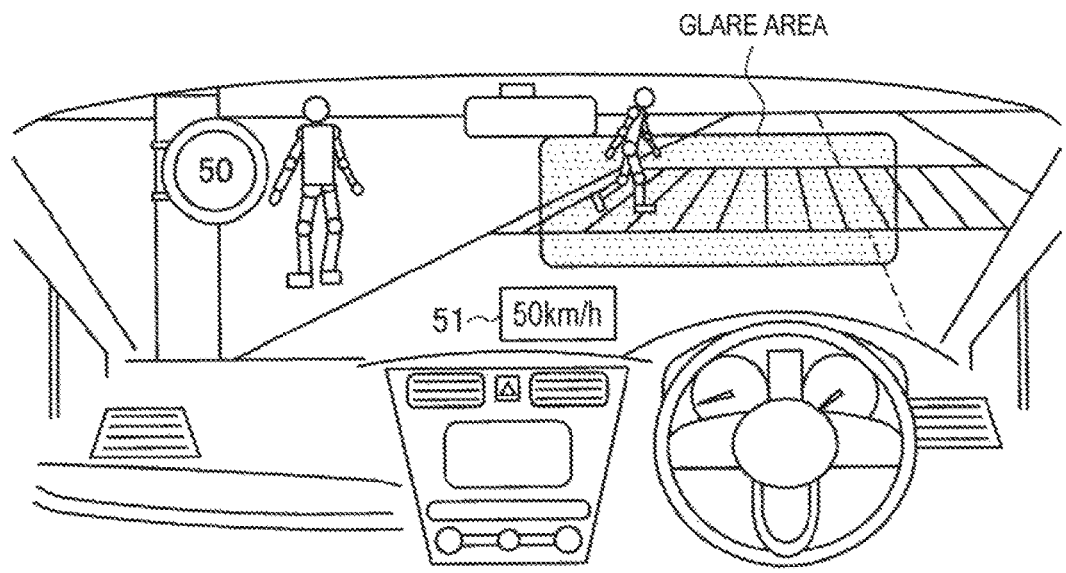
FIG. 21 is an explanatory diagram illustrating that a glare area occurs.
Figure 22:
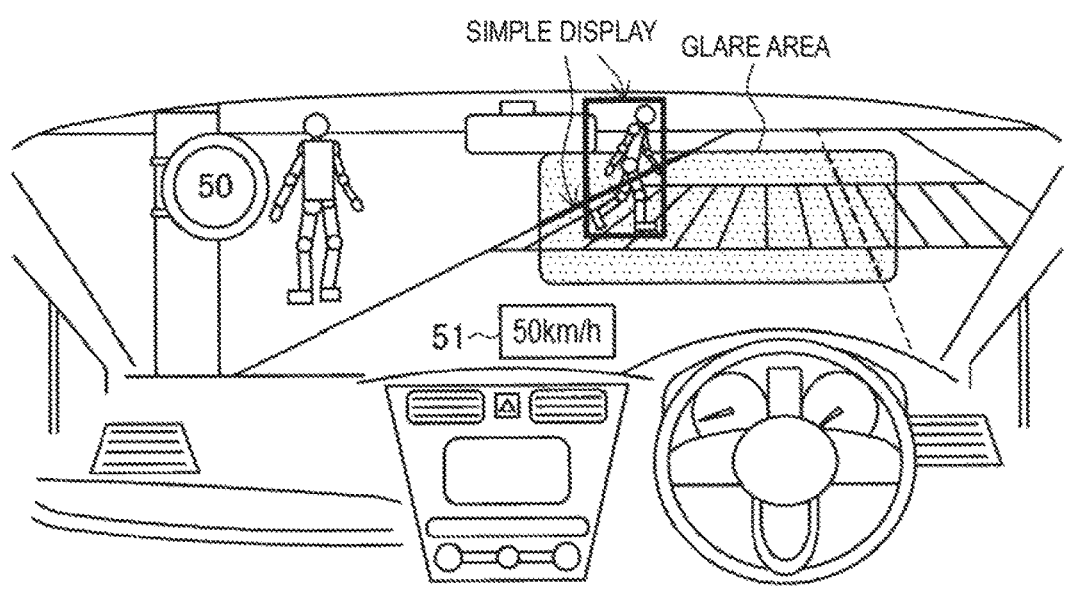
FIG. 22 is an explanatory diagram illustrating an example in which traveling direction information is presented on a glare area.

FIG. 21 illustrates that a glare area is formed at a position at which the glare area does not overlap with the driving information display 51. Traveling direction information necessary for driving the vehicle is simply displayed on the glare area as illustrated in the FIG. 22 in the condition in which the driving information display 51 does not overlap with the glare area. The example of FIG. 22 illustrates pedestrians in solid-line boxes, and the shoulder of a road by a solid line and a lane by a dashed line. Even if a glare area is formed, simple display displayed on the glare area thus facilitates the driver to grasp the traveling direction information of the vehicle and allows the driver to drive safely. Traveling direction information of the vehicle may include information such as preceding vehicles, traffic lights, road signs, and obstacles in addition to the examples illustrated in FIG. 22.

The display control method according to the second example makes one or both of the contrast and size of the driving information display 51 higher or larger to moderate decrease in the visibility of the windshield for the driver if a glare area is formed on the windshield and the driver keeps the gaze on the driving information display 51. If the driver does not keep the gaze on the driving information display 51, the display control method according to the second example moves the driving information display 51 to a position at which the driving information display 51 does not overlap with the glare area within the driving information display permission area to moderate decrease in the visibility of the driving information display 51 for the driver. That is to say, the display control device 100 does not move the position of the driving information display 51 while the driver is gazing at the driving information display 51. Accordingly, it is possible to make the driver feel less annoyed.

If a glare area is formed on the windshield, but the glare area does not overlap with the driving information display 51 with the gaze of the driver kept on the glare area, the display control method according to the second example displays the traveling direction information display on the glare area to supplement the driver's field of view. This thus moderates decrease in the driver's driving safety.

(2-3. Third Example)

Figure 23:
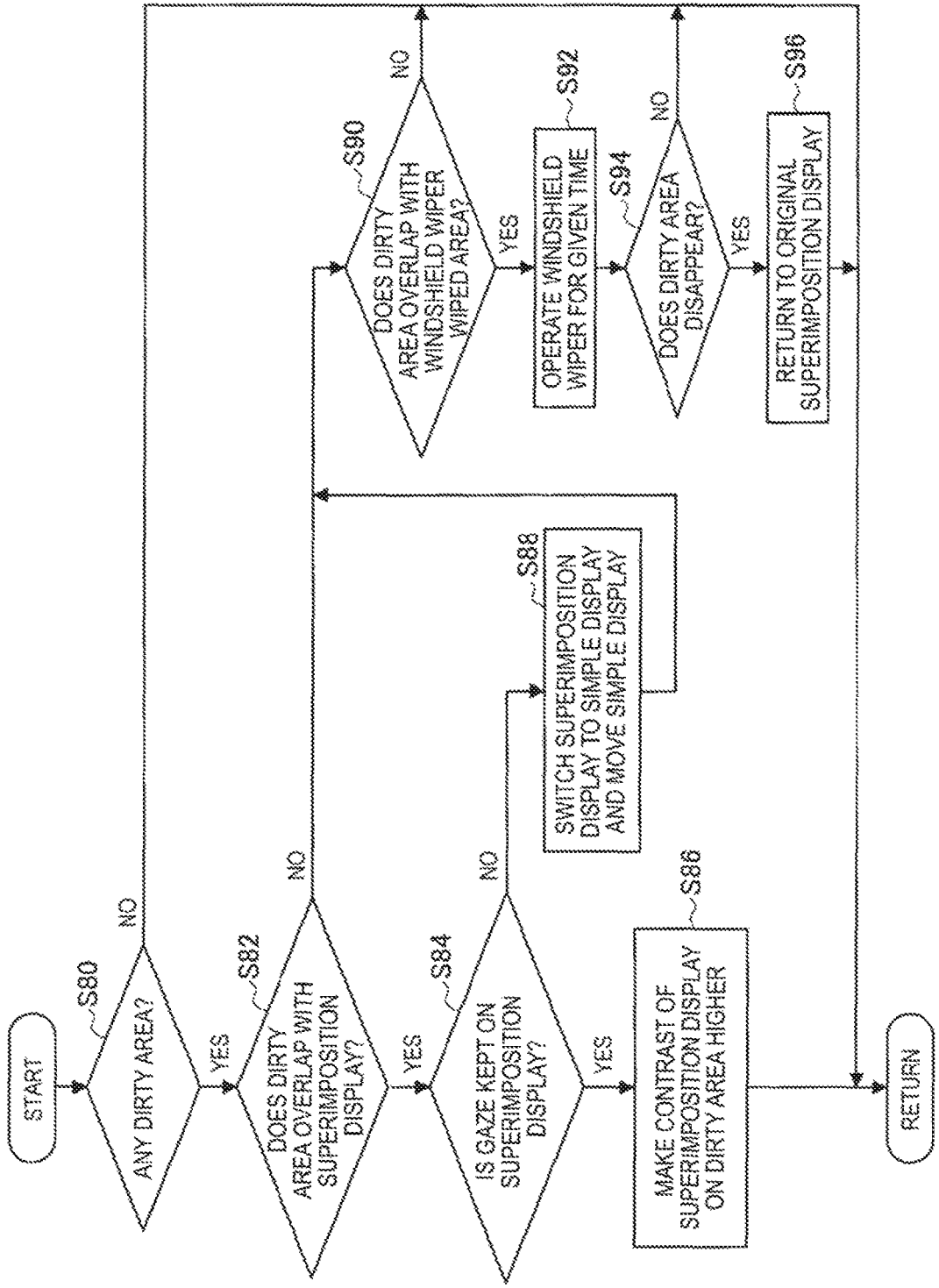
FIG. 23 is a flowchart illustrating a HUD display control method that reduces influence of a dirty area on superimposition display.

FIG. 23 is a flowchart illustrating the display control method according to the third example. FIG. 23 illustrates control processing for reducing the influence that a dirty area has on the visibility of superimposition display for the driver or the driver's poor field of view while a vehicle, an obstacle, a pedestrian, a road sign, a lane, or the like that can be visually recognized by the driver through the windshield is displayed on the windshield as traveling direction information display in a superimposition manner. First of all, in step S80, the dirty area detector 30 determines whether there is a dirty area on the windshield. Step S80 may be performed in a similar way to step S10 as discussed above.

If no dirty area is detected (S80: No), the dirty area detector 30 finishes the present routine and returns to the start. Meanwhile, if a dirty area is detected (S80: Yes), the display controller 110 determines in step S82 whether the dirty area overlaps with the superimposition display. For example, the display controller 110 may determine whether the coordinate group on the windshield at which the dirty area is detected overlaps with the display area of the superimposition display. If the dirty area overlaps with the superimposition display (S82: Yes), the display controller 110 determines in step S84 whether the driver keeps the gaze on the superimposition display. For example, the display controller 110 may determine whether the position of the gaze of the driver detected by the gaze sensor 20 overlaps with the display area of the superimposition display.

If the driver keeps the gaze on the superimposition display (S84: Yes), the display controller 110 makes the contrast of the superimposition display higher, moderates decrease in the visibility of the superimposition display for the driver, finishes the present routine, and returns to the start. Meanwhile, if the driver does not keep the gaze on the superimposition display (S84: No), the display controller 110 switches, in step S88, the superimposition display to simple display and displays the simple display at a position at which the simple display does not overlap with the dirty area. The display controller 110 may display the simple display within a preset simple display permission area. The simple display only has to be information indicating, for example, the presence of a preceding vehicle, a pedestrian, or an obstacle. The simple display may also be a letter or a figure, or a combination of a letter and a figure.

Figure 24:
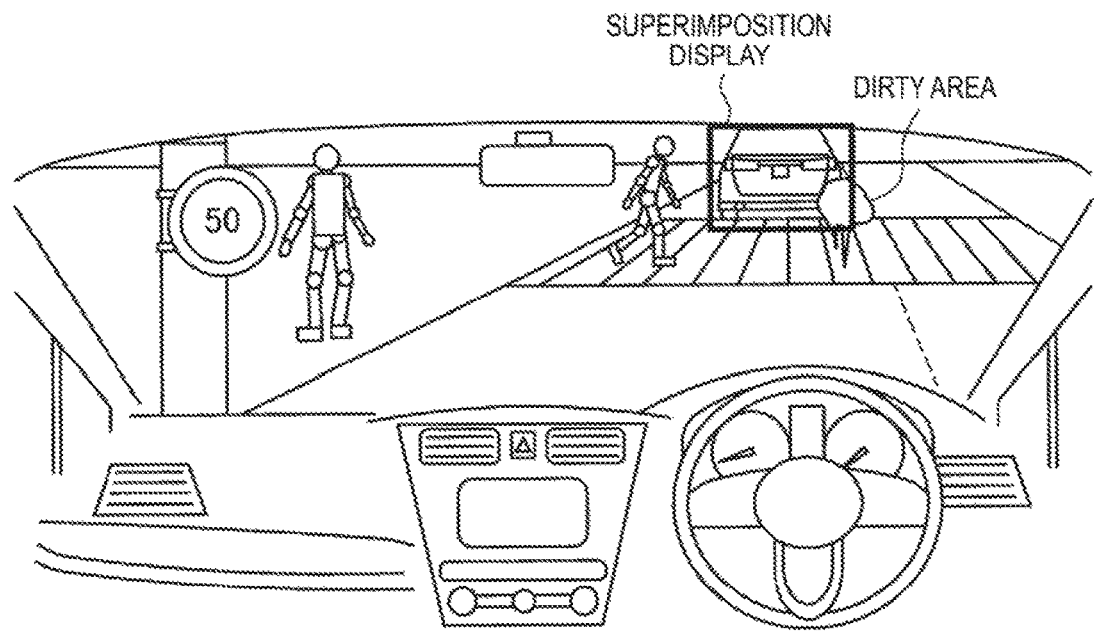
FIG. 24 is an explanatory diagram illustrating that an area overlaps with superimposition display.
Figure 25:
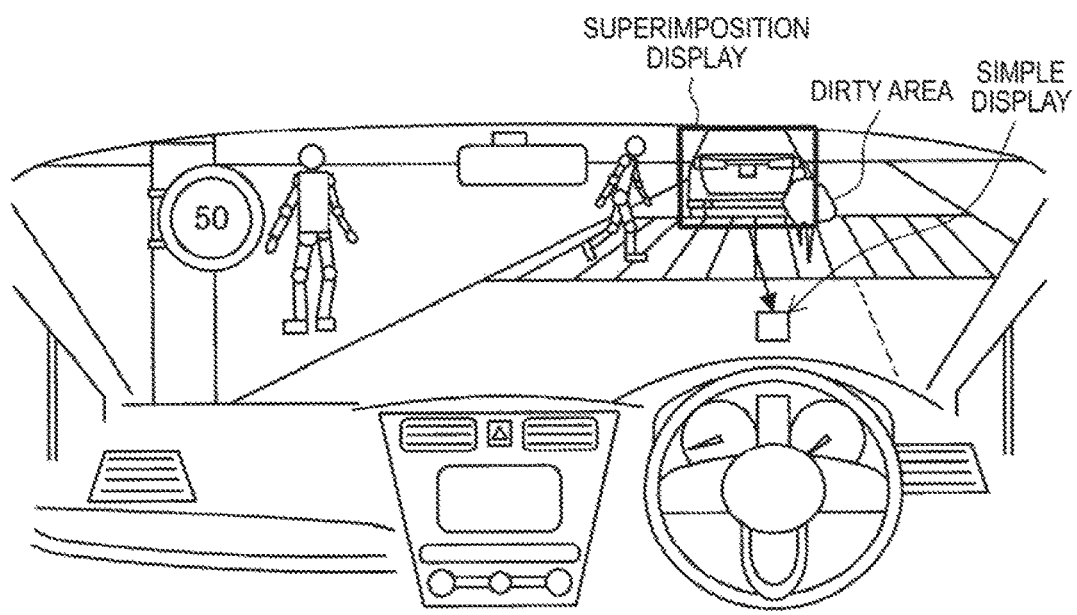
FIG. 25 is an explanatory diagram illustrating an example in which superimposition display is switched to simple display and the simple display is displayed.

FIGS. 24 and 25 describe the processes of steps S86 and S88, and schematically illustrate the driver's field of view. The example of FIG. 24 illustrates that superimposition display is displayed for a preceding vehicle, and a dirty area overlapping with the superimposition display is formed. In this case, as illustrated in FIG. 25, the display controller 110 makes the contrast higher without changing the superimposition display while the driver keeps the gaze on the superimposition display. This moderates decrease in the visibility of the superimposition display for the driver. Meanwhile, if the driver does not keep the gaze on the superimposition display, the display controller 110 switches the superimposition display to simple display and displays the simple display at a position at which the simple display does not overlap with the dirty area. This eliminates overlap between the superimposition display and the dirty area without annoying the driver, and the simple display makes it possible to provide information necessary for the driver.

After the process of step S88 is finished or if the dirty area does not overlap with the superimposition display in step S82 (S82: No), the display controller 110 determines in step S90 whether the dirty area overlaps with the windshield wiper wiped area. Step S90 may be performed in the same way as step S32 as discussed above. If the dirty area does not overlap with the windshield wiper wiped area (S90: No), the display controller 110 finishes the present routine and returns to the start. Meanwhile, if the dirty area overlaps with the windshield wiper wiped area (S90: Yes), the display controller 110 attempts to remove the dirty area in step S92 by operating the windshield wiper 80 for a given time.

Next, in step S94, the display controller 110 determines whether the dirty area disappears. It may be here determined whether the dirty area completely disappears or whether the size of the dirty area falls below a predetermined threshold. If the dirty area does not disappear (S94: No), the display controller 110 finishes the present routine and returns to the start. Meanwhile, if the dirty area disappears (S94: Yes), the display controller 110 stops the simple display and returns the simple display to the original superimposition display in step S96. Afterwards, the display controller 110 finishes the present routine and returns to the start.

If a dirty area is formed on the windshield and the driver keeps the gaze on superimposition display, the display control method according to the third example makes the contrast of the superimposition display higher to moderate decrease in the visibility of the superimposition display for the driver. If the driver does not keep the gaze on the superimposition display, the superimposition display is switched to simple display and the simple display is displayed at a position at which the simple display does not overlap with the dirty area. The display control device 100 does not thus switch the superimposition display to simple display or move the display position while the driver is watching the superimposition display. Accordingly, the display control device 100 can make the driver feel less annoyed.

(2-4. Fourth Example)

Figure 26:
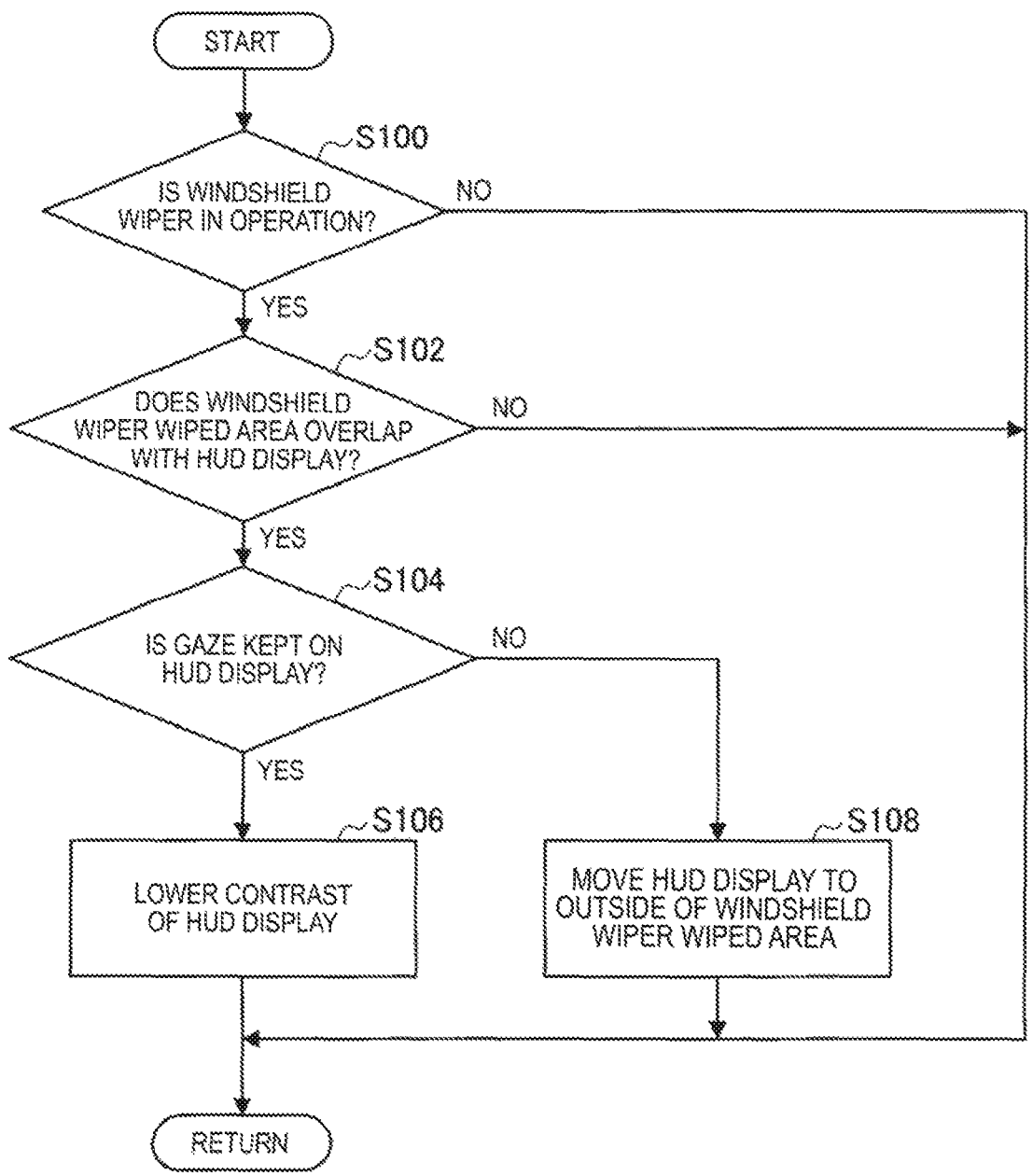
FIG. 26 is a flowchart illustrating a HUD display control method that reduces influence of a windshield wiper.

FIG. 26 is a flowchart illustrating the display control method according to the fourth example. FIG. 26 illustrates control processing for reducing the influence on the visibility of HUD display for the driver with the windshield wiper 80 in operation. Operating the windshield wiper 80 includes, for example, operating the windshield wiper 80 in step S34 or S92. First of all, in step S100, the display controller 110 determines whether the windshield wiper 80 is in operation. If the windshield wiper 80 is not in operation (S100: No), the display controller 110 finishes the present routine and returns to the start.

Meanwhile, if the windshield wiper 80 is in operation (S100: Yes), the display controller 110 determines in step S102 whether the windshield wiper wiped area overlaps with the HUD display. For example, the display controller 110 may determine whether the position of the currently displayed HUD display overlaps with the windshield wiper wiped area that is stored in advance. If the windshield wiper wiped area does not overlap with the HUD display (S102: No), the display controller 110 finishes the present routine and returns to the start. Meanwhile, if the windshield wiper wiped area overlaps with the HUD display (S102: Yes), the display controller 110 determines in step S104 whether the driver keeps the gaze on the HUD display. For example, the display controller 110 may determine whether the position of the gaze of the driver detected by the gaze sensor 20 overlaps with the display area of the HUD display.

If the driver keeps the gaze on the HUD display (S104: Yes), the display controller 110 lowers the contrast of the HUD display, moderates decrease in the visibility of the HUD display for the driver, finishes the present routine, and returns to the start. Part of the HUD display overlapping with the windshield wiper blade has higher contrast and is easier to visually recognize than the part of the HUD display not overlapping with the windshield wiper blade. Accordingly, the visibility of the HUD display is increased by lowering the contrast of the overlapping part. Meanwhile, if the driver does not keep the gaze on the HUD display (S104: No), the display controller 110 moves the display position of movable HUD display in step S108. For example, the display position of the simple display of driving information display or traveling direction information of the vehicle can be moved. Accordingly, the display controller 110 moves the display position at a position at which the display position does not overlap with the windshield wiper wiped area within the preset display permission area.

Figure 27:
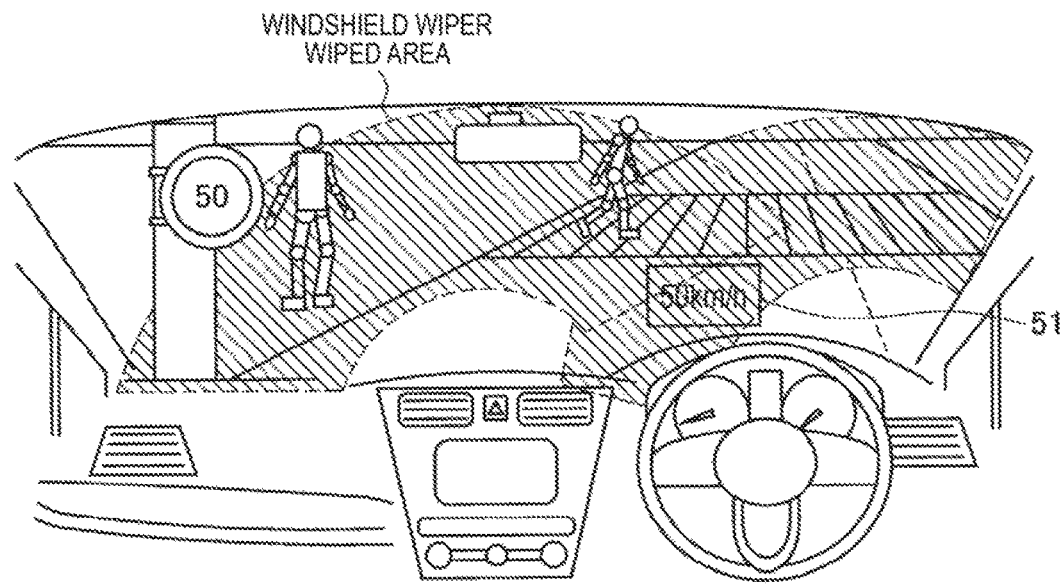
FIG. 27 is an explanatory diagram illustrating that a windshield wiper wiped area overlaps with HUD display.
Figure 28:
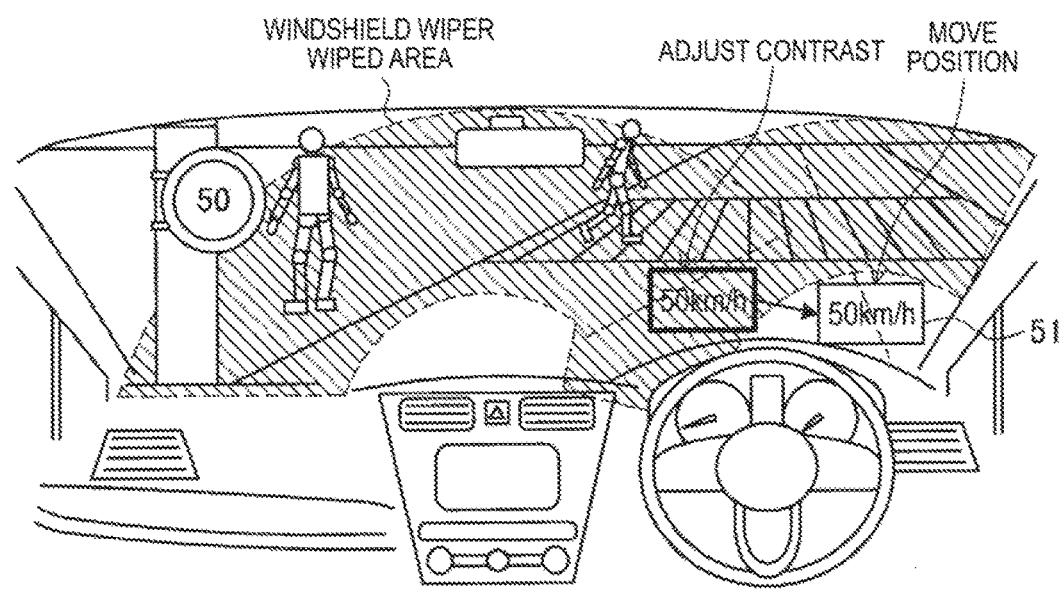
FIG. 28 is an explanatory diagram illustrating an example in which HUD display is moved.
Figure 29:
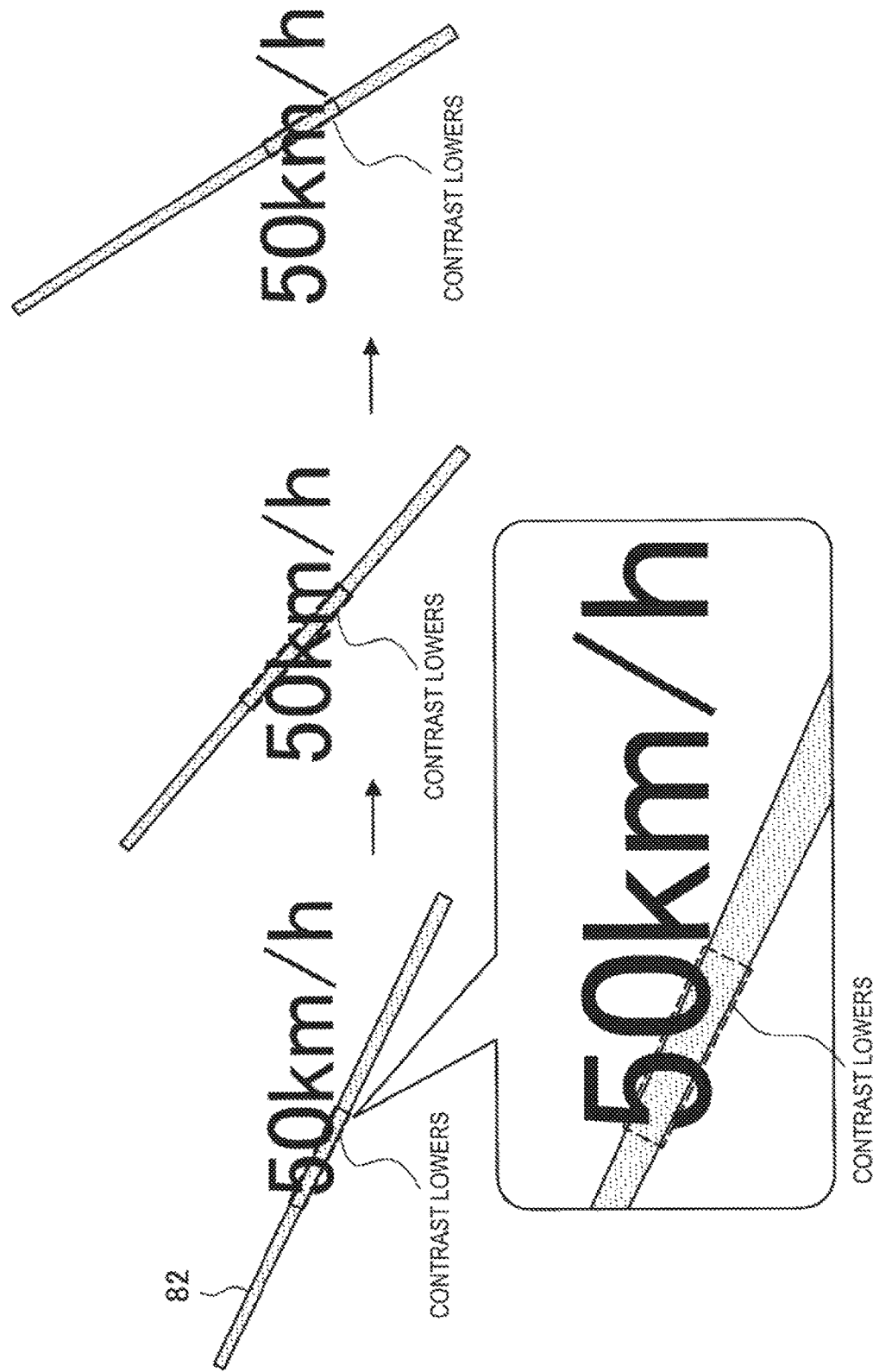
FIG. 29 is an explanatory diagram illustrating an example in which visibility of HUD display is maintained.

FIGS. 27 to 29 describe the processes of steps S106 and S108, and schematically illustrate the driver's field of view. FIG. 27 illustrates that the driving information display 51 displayed on the windshield overlaps with the windshield wiper wiped area. If the windshield wiper wiped area overlaps with the driving information display 51, the display controller 110 lowers the contrast of the driving information display 51 without moving the driving information display 51 as illustrated in FIG. 28 while the driver keeps the gaze on the driving information display 51. This moderates decrease in the visibility of the driving information display 51 for the driver. Meanwhile, if the driver does not keep the gaze on the driving information display 51, the display controller 110 moves the position of the driving information display 51. The driving information display 51 may be moved within the driving information display permission area. This eliminates overlap between the driving information display 51 and the windshield wiper wiped area without annoying the driver.

The contrast of part of HUD display which overlaps with a windshield wiper blade 82 and changes in association with the rotation of the windshield wiper blade 82 may be lowered as illustrated in FIG. 29 while the HUD display is at a position at which the HUD display overlaps with the windshield wiper wiped area. This makes smaller the difference in the visibility between the overlapping part with the windshield wiper blade 82 and the part that does not overlap with the windshield wiper blade 82, and can moderate decrease in the visibility of the HUD display.

The display control method according to the fourth example lowers the contrast of HUD display and moderates decrease in the visibility of the HUD display for the driver if the windshield wiper 80 is in operation with the HUD display on the windshield and the driver keeps the gaze on the HUD display. If the driver does not keep the gaze on the HUD display, movable HUD display is moved to a position at which the movable HUD display does not overlap with the windshield wiper wiped area, and decrease in the visibility of the HUD display for the driver is moderated. That is to say, the display control device 100 does not move the position of HUD display while the driver is watching the HUD display. Accordingly, it is possible to make the driver feel less annoyed.

As described above, if a visibility reducing area does not overlap with driving information display, and the driver keeps the gaze on the visibility reducing area, the display control device 100 for a vehicle according to the present implementation displays traveling direction information display on the visibility reducing area. Even if a visibility reducing area obscures the driver's field of view, the driver's field of view is thus supplemented and decrease in the driving safety is moderated.

In addition, if HUD display overlaps with a visibility reducing area, but the driver does not keep the gaze on the HUD display, the display control device 100 for a vehicle according to the present implementation moves the position of movable HUD display such as driving information display and simple display to the outside of the visibility reducing area. It is thus possible to make the driver feel less annoyed and to moderate decrease in the visibility of HUD display. If HUD display overlaps with a visibility reducing area, the display control device 100 for a vehicle adjusts one or both of the contrast and size of the HUD display overlapping with the visibility reducing area while the driver keeps the gaze on the HUD display. This moderates decrease in the visibility of HUD display.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

According to the implementation of the present invention, it is possible to display traveling direction information display that supplements a driver's field of view if an area that reduces the visibility of HUD display obscures the driver's field of view.

The invention claimed is:

1. A display control device for a vehicle, the display control device comprising:
    a display controller configured to display display images on a windshield of the vehicle, the display images comprising a first display of a traveling direction information that is necessary to drive the vehicle and a second display of a traveling state of the vehicle;
    a visibility reducing area detector configured to detect a presence or an absence of a visibility reducing area on the windshield, wherein the visibility reducing area has lower visibility of a driver than a visibility area that is provided on the windshield adjacently to the visibility reducing area; and
    a gaze detector configured to detect a gaze of the driver, wherein while the display controller displays the display images on the windshield, and when (1) the visibility reducing area detector detects the visibility reducing area, (2) the display controller displays the second display on the visibility area, and (3) the display controller determines that the driver keeps the gaze on the visibility reducing area, the display controller switches the display images from first images in that no displays are displayed on the visibility reducing area into second images in that the first display is displayed on the visibility reducing area.

2. The display control device for the vehicle according to claim 1, wherein the display controller makes higher or larger one or both of a contrast and a size of the first display on the visibility reducing area.

3. The display control device for the vehicle according to claim 2, wherein
    the first display on the visibility reducing area comprises a superimposition display image of an information that is visually recognized through the windshield, and
    when a dirty area having dirt on the windshield is detected as the visibility reducing area and the dirty area overlaps with the superimposition display image, the display controller switches the information of the superimposition display image to a simple display image and displays the simple display image in an area in which the simple display image does not overlap with the dirty area, while the display controller determines that the driver does not keep the gaze on the superimposition display image.

4. The display control device for the vehicle according to claim 2, wherein when a dirty area having dirt on the windshield is detected, the visibility reducing area detector detects a size of the dirty area.

5. The display control device for the vehicle according to claim 4, wherein when the size of the dirty area is greater than or equal to a determined range, the display controller displays the first display on the visibility reducing area.

6. The display control device for the vehicle according to claim 5, wherein when the size of the dirty area is greater than or equal to the determined range, the display controller executes a warning process.

7. The display control device for the vehicle according to claim 4, wherein when the size of the dirty area is greater than or equal to a determined range, the display controller executes a warning process.

8. The display control device for the vehicle according to claim 1, wherein
    the first display on the visibility reducing area comprises a superimposition display image of an information that is visually recognized through the windshield, and
    when a dirty area having dirt on the windshield is detected as the visibility reducing area and the dirty area overlaps with the superimposition display image, the display controller switches the information of the superimposition display image to a simple display image and displays the simple display image in an area in which the simple display image does not overlap with the dirty area, while the display controller determines that the driver does not keep the gaze on the superimposition display image.

9. The display control device for the vehicle according to claim 8, wherein when the dirty area having dirt on the windshield is detected, the visibility reducing area detector detects a size of the dirty area.

10. The display control device for the vehicle according to claim 9, wherein when the size of the dirty area is greater than or equal to a determined range, the display controller displays the first display on the visibility reducing area.

11. The display control device for the vehicle according to claim 10, wherein when the size of the dirty area is greater than or equal to the determined range, the display controller executes a warning process.

12. The display control device for the vehicle according to claim 9, wherein when the size of the dirty area is greater than or equal to a determined range, the display controller executes a warning process.

13. The display control device for the vehicle according to claim 1, wherein
    when a dirty area having dirt on the windshield is detected, the visibility reducing area detector detects a size of the dirty area.

14. The display control device for the vehicle according to claim 13, wherein when the size of the dirty area is greater than or equal to a determined range, the display controller displays the first display on the visibility reducing area.

15. The display control device for the vehicle according to claim 14, wherein when the size of the dirty area is greater than or equal to the determined range, the display controller executes a warning process.

16. The display control device for the vehicle according to claim 13, wherein when the size of the dirty area is greater than or equal to a determined range, the display controller executes a warning process.

17. The display control device for the vehicle according to claim 1, wherein
    when a dirty area having dirt on the windshield is detected, the visibility reducing area detector detects a size of the dirty area,
    the display controller is further configured to:
        switch the display images from the first images into the second images when the size of the dirty area is greater than or equal to a determined range.

18. The display control device for the vehicle according to claim 1, wherein
    when a dirty area having dirt on the windshield is detected, the visibility reducing area detector detects a size of the dirty area,
    the display controller is further configured to:
        when the size of the dirty area is greater than or equal to a determined range, the display controller switches the display images from the first images into the second images, and
        when the size of the dirty area is less than the determined range, the display controller maintains the display images of the first images.

19. The display control device for the vehicle according to claim 1, wherein the first display includes an image of a real scene that is obscured by the visibility reducing area, and wherein the real scene is a scene in front of the windshield.

20. A display control device for a vehicle, the display control device comprising:
   circuitry configured to:
   display display images on a windshield of the vehicle, the display images comprising a first display of a traveling direction information that is necessary to drive the vehicle and a second display of a traveling state of the vehicle;
   detect a presence or an absence of a visibility reducing area on the windshield, wherein the visibility reducing area has a lower visibility of a driver than a visibility area that is provided on the windshield adjacently to the visibility reducing area; and
   detect a gaze of the driver,
   wherein while the circuitry displays the display images on the windshield, and when (1) the visibility reducing area detector detects the visibility reducing area, (2) the circuitry displays the second display on the visibility area that is provided on the windshield adjacently to the visibility reducing area, and (3) the circuitry determines that the driver keeps the gaze on the visibility reducing area, the circuitry switches the display images from first images in that no displays are displayed on the visibility reducing area into second images in that the first display is displayed on the visibility reducing area, and display the display images on the windshield.

* * * * *